United States Patent Office 3,072,642
Patented Jan. 8, 1963

3,072,642
16 - OXYGENATED - 4 - PREGNENO - [3,2-c]
PYRAZOLES AND PROCESS OF PREPARING THEM
Ralph F. Hirschmann, Scotch Plains, and Arthur A. Patchett, Metuchen, N.J., assignors to Merck & Co., Inc., Rahway, N.J., a corporation of New Jersey
No Drawing. Filed Mar. 5, 1962, Ser. No. 177,169
26 Claims. (Cl. 260—239.5)

This invention is concerned generally with novel steroids and with processes of preparing the same. More particularly it relates to novel 11β,16α,17α-trihydroxy-20-oxo - 4 - pregneno- and 4,6-pregnadieno-[3,2-c]pyrazole compounds and to the 16α,17α-acetals and ketals of these [3,2-c]pyrazoles.

The novel compounds which form the subject of the present invention have structural Formulas A and B.

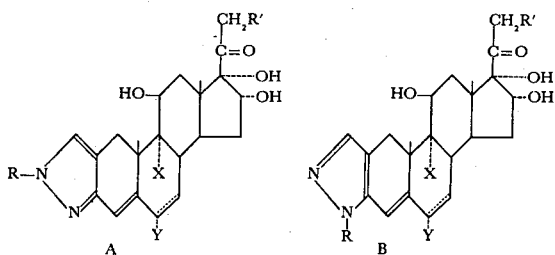

wherein the dotted line between carbons 6 and 7 indicates that a double bond may be present in this position, and wherein R' refers to hydrogen, fluoro-hydroxy, acyloxy, the dihydrogen phosphate, and the alkali metal salts of the dihydrogen phosphate, R is hydrogen acyl, alkyl, aralkyl, cycloalkyl, aryl, a heterocyclic nucleus or substituted derivatives thereof, X refers to hydrogen or fluoro, and Y refers to hydrogen, methyl, fluoro or chloro groups.

The 16α,17α-acetals and ketals of the above compounds which are also indcluded in the present invention have the following structures:

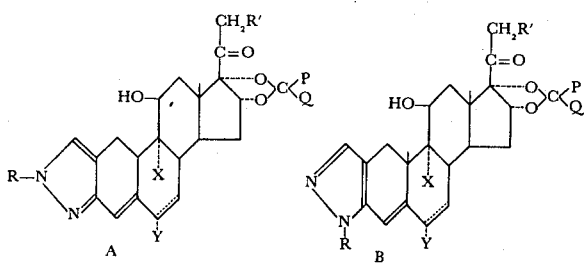

wherein the dotted line between carbons 6 and 7, and R, R', X and Y have the meaning above defined and wherein P and Q are each selected from the group consisting of hydrogen, alkyl and aryl, and together with the carbon to which they are joined, P and Q are cycloalkyl.

The above defined [3,2-c]pyrazole-steroids possess high anti-inflammatory activity and are especially effective for the treatment of arthritis and related diseases since they can be administered for their cortisone-like action in low dosage thereby minimizing undesirable side effects.

In preparing our novel chemical compounds, the starting material utilized is an 11-oxygenated-16α,17α,21-trihydroxy-4-pregnene-3,20-dione, or a Δ⁴,⁶-analog thereof, which has a protected cortical side chain. The side chain of the steroid may be protected with an ethylenedioxy group at carbon-20, as shown in compound 1 of Flow Sheet A. The side chain may also be protected by forming the 16α,17α-acetal or ketal, together with a tetrahydropyranyl group at carbon-21, as shown is compound 8 of Flow Sheet B.

The 11-oxygenated-16α,17α,21-trihydroxy-4-pregnene-3,20-dione (or the Δ⁴,⁶-analogs thereof) used as starting materials for the compounds shown in Flow Sheet A are prepared from the known 11-oxygenated-17α,21-dihydroxy-4-pregnene-3,20-diones as indicated on the Flow Sheet for Starting Materials, in column 6, lines 1–40.

Among the compounds which may be used as starting materials are the following:

11β,16α,17α,21-tetrahydroxy-4-pregnene-3,20-dione,
6α-chloro-11β,16α,17α,21-tetrahydroxy-4-pregnene-3,20-dione;
6α-fluoro-11β,16α,17α,21-tetrahydroxy-4-pregnene-3,20-dione;
6α-methyl-11β,16α,17α,21-tetrahydroxy-4-pregnene-3,20-dione;
9α-fluoro-11β,16α,17α,21-tetrahydroxy-4-pregnene-3,20-dione;
6α-chloro-9α-fluoro-11β,16α,17α,21-tetrahydroxy-4-pregnene-3,20-dione;
6α,9α-difluoro-11β,16α,17α,21-tetrahydroxy-4-pregnene-3,20-dione; and
6α-methyl-9α-fluoro-11β-16α,17α,21-tetrahydroxy-4-pregnene-3,20-dione.

Detailed procedures for preparing specific starting materials included in Flow Sheet B, starting from known intermiates are included in columns 28–30.

Upon treatment of an 11-oxygenated 16α,17α,21-trihydroxy-4-pregnene-3,20-dione (or a Δ⁴,⁶-analog thereof), having a protected side chain, with an alkyl formate and sodium hydride in an inert atmosphere there is formed the corresponding 2-hydroxymethylene derivative which may be mixed with the formate esters thereof. The 2-hydroxymethylene-derivative is designated on Flow Sheet A as compound 2 and on Flow Sheet B as compound 11. In a preferred embodiment of our invention, the steroid is dissolved in a solvent such as benzene or pyridine and the resulting solution is cooled to room temperature and treated with ethyl formate. The air in the system is replaced with nitrogen, sodium hydride or alkoxide is added and the mixture is stirred at room temperature for several hours.

The 2-hydroxymethylene compound and/or its derived formates reacts with hydrazine in an inert atmosphere to form the corresponding [3,2-c]pyrazole.

Upon treatment of the 2-hydroxymethylene-compound with a lower alkanol in the presence of an acidic reagent such as p-toluenesulfonic acid the corresponding 2-alkoxymethylene-compound is formed. When the hydroxymethylene compound containing variable amounts of the alkoxymethylene derivative is reacted with a monosubstituted hydrazine, the following N-substituted [3,2-c]-pyrazole derivatives are formed,

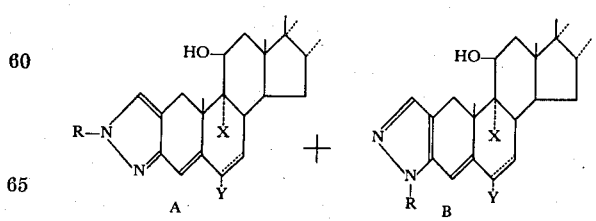

wherein X, Y and R have the significance above defined. The above compounds are shown on Flow Sheet A as compounds 3A and 3B, and on Flow Sheet B as compounds 12A and 12B. The mixture of products may be separated by chromatography. The N-substituted-[3,2-c]pyrazoles having structure A are designated as the 1'-substituted-[3,2-c]pyrazoles and the N-substituted compounds having structure B are designated as the 2'-substituted [3,2-c]pyrazoles.

Upon treatment of a 2-hydroxymethylene-compound directly with a monosubstituted arylhydrazine, without the intermediate formation of the 2-alkoxymethylene-derivative, one isomer is generally formed in preponderant amounts, whereas when reacting the 2-alkoxymethylene-compound with a monosubstituted arylhydrazine, significant amounts of both isomers are obtained. When these reactions take place with monosubstituted-alkylhydrazines, mixtures may be obtained when starting with the 2-hydroxymethylene-steroid as well as with the 2-alkoxymethylene-steroid. A mixture of isomers may also result from the reaction of a monosubstituted-hydrazine with a 2-hydroxymethylene-compound which possibly contains variable amounts of the 2-alkoxymethylene-compound due to the operating procedures employed, for example, due to recrystallization in the presence of a trace of alcohol a solution of the 2-hydroxymethylene-compound from which acid has not been completely removed.

Any formate ester groups present in the resulting [3,2-c]pyrazole may be removed by treating with sodium methoxide in methanol at room temperature for about 10 minutes.

Among the monosubstituted hydrazines which may be used for the process of our invention are: alkylhydrazines, such as methylhydrazine, ethylhydrazine, propylhydrazines, butylhydrazines, β-hydroxyethylhydrazine; cycloalkylhydrazines; monosubstituted-hydrazines which may be derived from any aromatic or heterocyclic ring nucleus including phenylhydrazine and the substituted phenylhydrazines, such as o-, m-, and p-halophenylhydrazines, o-, m-, and p-tolyhydrazines, o-, m-, and p-alkoxyphenylhydrazines, o-, m-, and p-nitrophenylhydrazines, 1-hydrazinonaphthalene; 2-hydrazinopyridine, 3-hydrazinopyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted-[3,2-c]pyrazoles including: N-alkyl such as N-methyl-, N-ethyl-, N-butyl, N-propyl-, N-(β-hydroxyethyl)-; N-cycloalkyl-; N-substituted derivatives which may be derived from any aromatic or heterocyclic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-(4''-pyridyl)-, N-(4''-pyridyloxide)-, N-(2''-pyrimidyl)-; N-aralkyl, such as N-benzyl- and N-phenylethenyl-4-pregneno- or 4,6-pregnadieno-[3,2-c]pyrazoles.

An 11-keto-group is reduced to the 11β-hydroxy-group using sodium borohydride. The 20-ethylenedioxy-group is removed by heating the steroid, dissolved in a solvent such as methanol, with aqueous sulfuric acid.

The dihydroxy-steroid is converted into the 16α,17α-acetal or ketal by treating with a carbonyl reactant of the general formula:

wherein P and Q are each selected from the group consisting of hydrogen, alkyl, and aryl, and together with the carbon to which they are joined, P and Q are cycloalkyl. For example, a suspension of the free 11β,16α,17α,21-tetrol in a ketone or aldehyde is treated with a trace of perchloric acid and stirred at room temperature until solution is complete. The ketones and aldehydes which are suitable for this purpose include acetaldehyde, methyl ethyl ketone, cyclohexanone, and acetophenone.

In a preferred embodiment of our invention acetone is used. For purposes of greater simplicity in the formulas the ketal shown in all the flow sheets is the 16α,17α-isopropylidenedioxy-derivative which is obtained with acetone. However, it is understood that other acetal and ketal derivatives may be substituted in these examples. The 16α,17α-acetonide group may be removed by heating for a short time with 60% formic acid.

The N-substituted-11β,21-dihydroxy-16α,17α-isopropylidenedioxy-20-oxo-4-pregneno-(or 4,6-pregnadieno)[3,2-c]pyrazole (compound 6 of Flow Sheet A) is converted into the 21-acyloxyderivative by treating with one equivalent of an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such a β,β-dimethyl-glutaric anhydride, succinic anhydride and the like, in the presence of an organic base such as pyridine.

The N-unsubstituted-11β,21-dihydroxy-16α,17α-isopropylidenedioxy - 20-oxo-4-pregneno-(or 4,6-pregnadieno)-[3,2-c]pyrazole is converted into the 21-acyl derivative by reacting with 2 equivalents of the acylating agent to form the N-acyl-21-acetate and then heating the latter compound with aqueous acetic acid, whereupon the N-acyl group is selectively removed.

The products of our invention include, among others, the following:

11β,16α,17α,21-tetrahydroxy-20-oxo-4-pregneno-[3,2-c]pyrazole;

6α-chloro-11β,16α,17α,21-tetrahydroxy-20-oxo-4-pregneno[3,2-c]pyrazole;

6α-fluoro-11β,16α,17α,21-tetrahydroxy-20-oxo-4-pregneno-[3,2-c]pyrazole;

11β,16α,17α,21-tetrahydroxy-6α-methyl-20-oxo-4-pregneno-[3,2-c]pyrazole;

9α-fluoro-11β,16α,17α,21-tetrahydroxy-20-oxo-4-pregneno-[3,2-c]pyrazole;

6α-chloro-9α-fluoro-11β,16α,17α,21-tetrahydroxy-20-oxo-4-pregneno-[3,2-c]pyrazole;

6α,9α-difluoro-11β,16α,17α,21-tetrahydroxy-20-oxo-4-pregneno-[3,2-c]pyrazole;

9α-fluoro-11β,16α,17α,21-tetrahydroxy-6α-methyl-20-oxo-4-pregneno-[3,2-c]pyrazole.

This invention also includes the 16α,17α-acetals and ketals of the foregoing compounds, as well as the 1'- and 2'-acyl, 1'- and 2'-alkyl-, the 1'- and 2'-cycloalkyl-, the 1'- and 2'-aralkyl and the 1'- and 2'-substituted derivatives which may be derived from any aromatic or heterocyclic nucleus of all the above named compounds, as well as their 16α,17α-acetals and ketals, and their 21-acylates.

This invention also includes the Δ$^{4,6}$-analogs of all of the foregoing compounds.

In order to convert the 21-hydroxy group of an N-substituted 11β,21-dihydroxy-16α,17α-isopropylidenedioxy 20-oxo-40-pregneno-(or 4,6-pregnadieno)[3,2-c]pyrazole (compounds 13 and 18 of Flow Sheet C) into the corresponding 21-desoxy-derivative (compound 22), the 21-hydroxy compound is first reacted with methane sulfonyl chloride in a non-aqueous base to form the 21-mesylate (compound 19). The 21-mesylate is heated with an alkali iodide to form the 21-iodo-steroid (compound 21), which is then reacted with an alkali metal bisulfite to form the 21-desoxy-derivative (compound 22).

In order to convert the 21-hydroxy group of an N-unsubstituted-11β,21-dihydroxy-16α,17α-isopropylidenedioxy 20 - oxo-4-pregneno-(or 4,6-pregnadieno)[3,2-c]pyrazole (compounds 6 and 13 of Flow Sheet C) into the 21-desoxy derivative, the 21-hydroxy group is first converted into the 21-tetrahydropyranyl ether (compounds 7 and 12). This is accomplished by treating the steroid with dihydropyran in the presence of an acidic reagent such as concentrated hydrochloric acid. The steroid is then reacted with acetic anhydride in a non-aqueous base to form the N-acetyl-derivative (compound 17). The 21-tetrahydropyranyl ether group of compound 17 is then removed by treating a methanol solution of the steroid with a p-toluenesulfonic acid. The N-acetyl-21-hydroxy-20 - oxo-4-pregneno-(or 4,6-pregnadieno) [3,2-c]pyrazole (compound 18) is then converted into the corresponding 21-desoxy-derivative (compound 22) by the procedure described above for the N-substituted pyrazole. The N-acetyl group of compound 22 is finally removed by treatment of the steroid with sodium methoxide in methanol.

The 21-desoxy-compounds of our invention include the following:

11β,16α,17α-trihydroxy-20-oxo-4-pregneno-[3,2-c]pyrazole;
6α-chloro-11β,16α,17α-trihydroxy-20-oxo-4-pregneno-[3,2-c]pyrazole;
6α-fluoro-11β,16α,17α-trihydroxy-20-oxo-4-pregneno-[3,2-c]pyrazole;
11β,16α,17α-trihydroxy-6α-methyl-20-oxo-4-pregneno-[3,2-c]pyrazole;
6α-chloro-9α-fluoro-11β,16α,17α-trihydroxy-20-oxo-4-pregneno-[3,2-c]pyrazole;
6α,9α-difluoro-11β,16α,17α-trihydroxy-20-oxo-4-pregneno-[3,2-c]pyrazole; and
9α-fluoro-11β,16α,17α-trihydroxy-6α-methyl-20-oxo-4-pregneno-[3,2-c]pyrazole.

This invention also includes the 16α,17α-acetals and ketals of the foregoing compounds, as well as the 1'- and 2'-acyl-, the 1' and 2'-alkyl, the 1'- and 2'-cycloalkyl-, the 1'- and 2'-aralkyl-derivatives and the 1'- and 2'-substituted derivatives whcih may be derived from any aromatic or heterocyclic nucleus of all of the above named compounds, as well as their 16α,17α-acetals and ketals. This invention also includes the Δ4,6-analogs df all of the foregoing compounds.

The 21-fluoro-derivatives of all of the above named compounds are obtained by heating the corresponding 21-mesylate with an alkali metal fluoride, preferably in a solvent such as dimethylformamide.

The 21-dihydrogen phosphate esters are prepared by the reaction of the corresponding 21-iodo compound with a mixture of silver phosphate and phosphoric acid. Both the mono and dialkali metal salts may be obtained by neutralization of the dihydrogen phosphate ester with an alkali metal hydroxide. Treatment with additional amounts of alkali methoxide will convert an N-acyl (R-acyl) into the free amine (R=H) dialkali metal salt from which the dihydrogen phosphate can be obtained by contacting with an ion exchange resin.

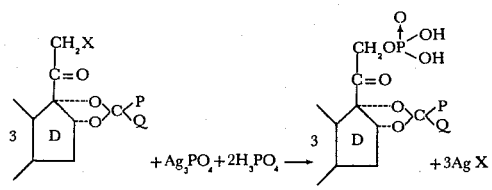

The [3,2-c]pyrazolo compounds described in the foregoing structures form salts such as the hydrochloride, sulfate, chlorate, perchlorate, picrate and trichloroacetate, on treatment with the corresponding acid.

A further embodiment of our invention comprises novel pharmaceutical compositions containing the novel [3,2-c]pyrazolo compounds of the pregnane series, exemplified in the foregoing structures.

The following examples illustrate methods of carrying out the present invention but it is to be understood that these examples are given for purposes of illustration and not of limitation.

FLOW SHEET OF STARTING MATERIALS

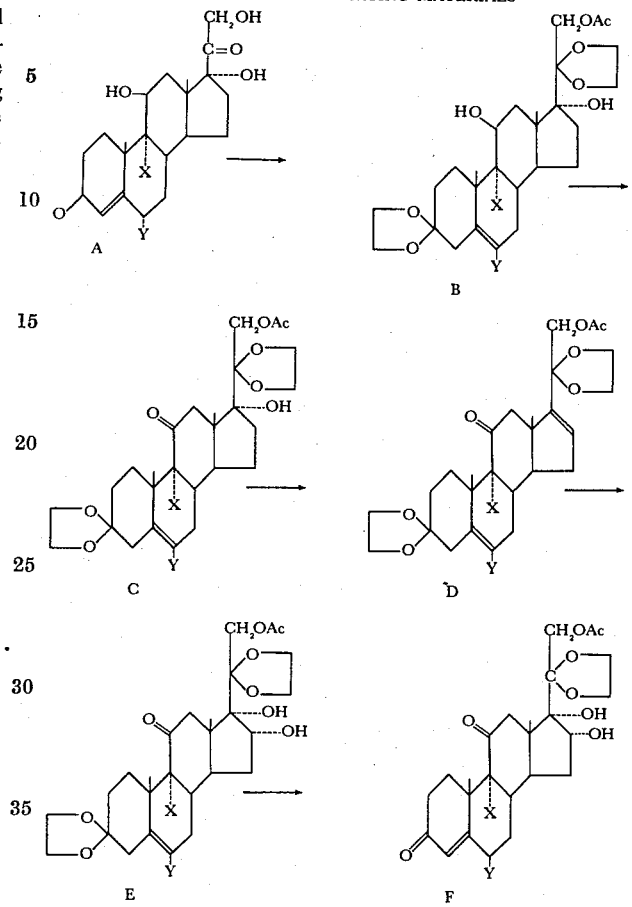

wherein X is a member of the group consisting of hydrogen, and fluoro, Y is a member of the group consisting of methyl, fluoro and chloro and R is a member of the group consisting of alkyl, cycloalkyl, aryl, aralkyl, and a heterocyclic nucleus, or substituted derivatives thereof.

FLOW SHEET A

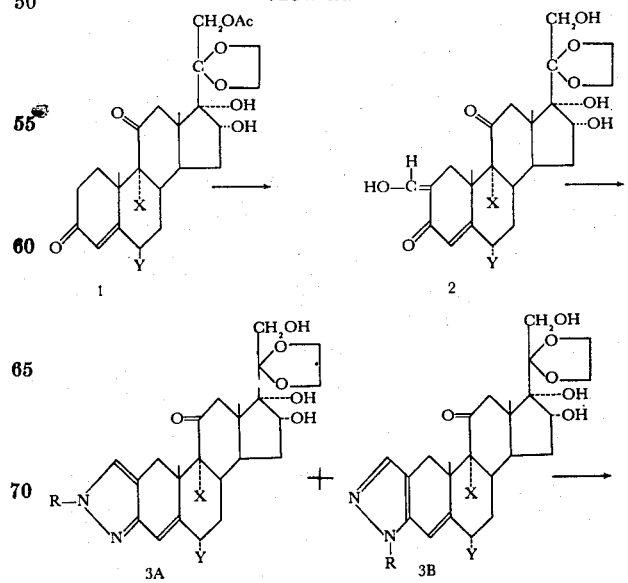

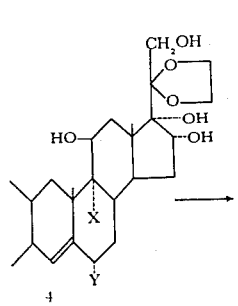
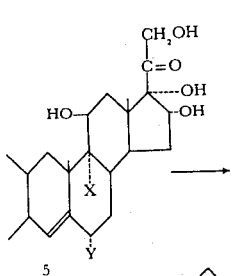
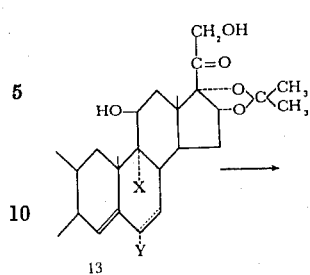
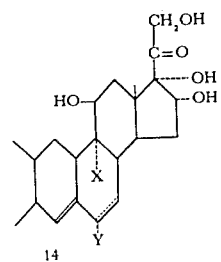

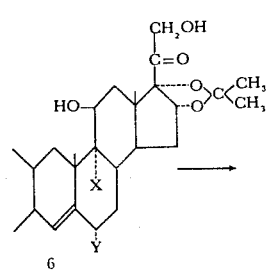
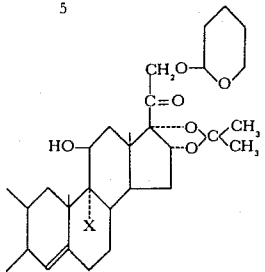

wherein X is a member of the group consisting of hydrogen and fluoro, Y is a member of the group consisting of methyl, fluoro and chloro and R is a member of the group consisting of hydrogen, alkyl, cycloalkyl, aralkyl, aryl, and a heterocyclic nucleus or substituted derivatives thereof.

FLOW SHEET B

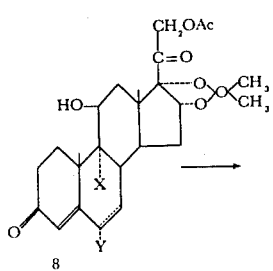
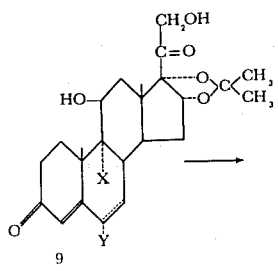

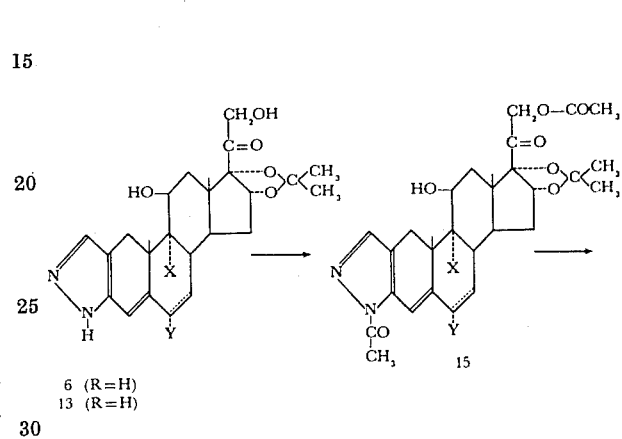

6 (R=H)
13 (R=H)

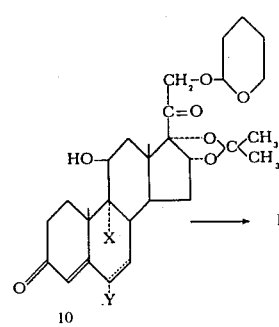
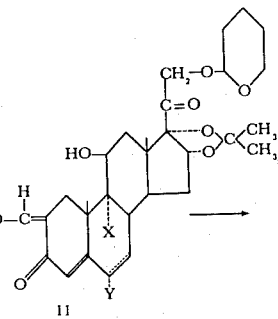

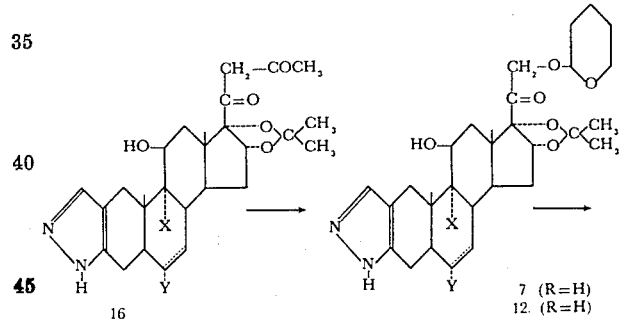

7 (R=H)
12 (R=H)

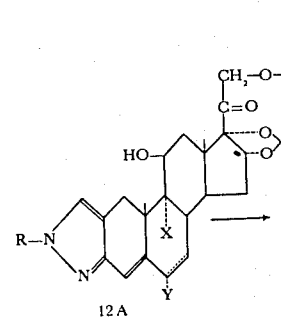
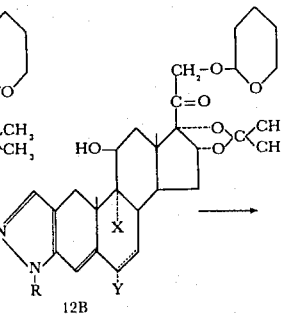

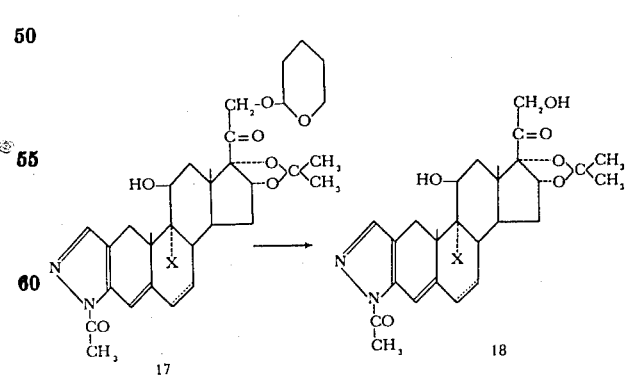

wherein the linkage indicated by the broken line between carbon atoms 6 and 7 indicates that a double bond may be present in this position, and wherein X is a member of the group consisting of hydrogen and fluoro, Y is a member of the group consisting of methyl, fluoro and chloro, and R is a member of the group consisting of hydrogen, alkyl, cycloalkyl, aryl, aralkyl, and a heterocyclic nucleus, or substituted derivatives thereof.

FLOW SHEET C

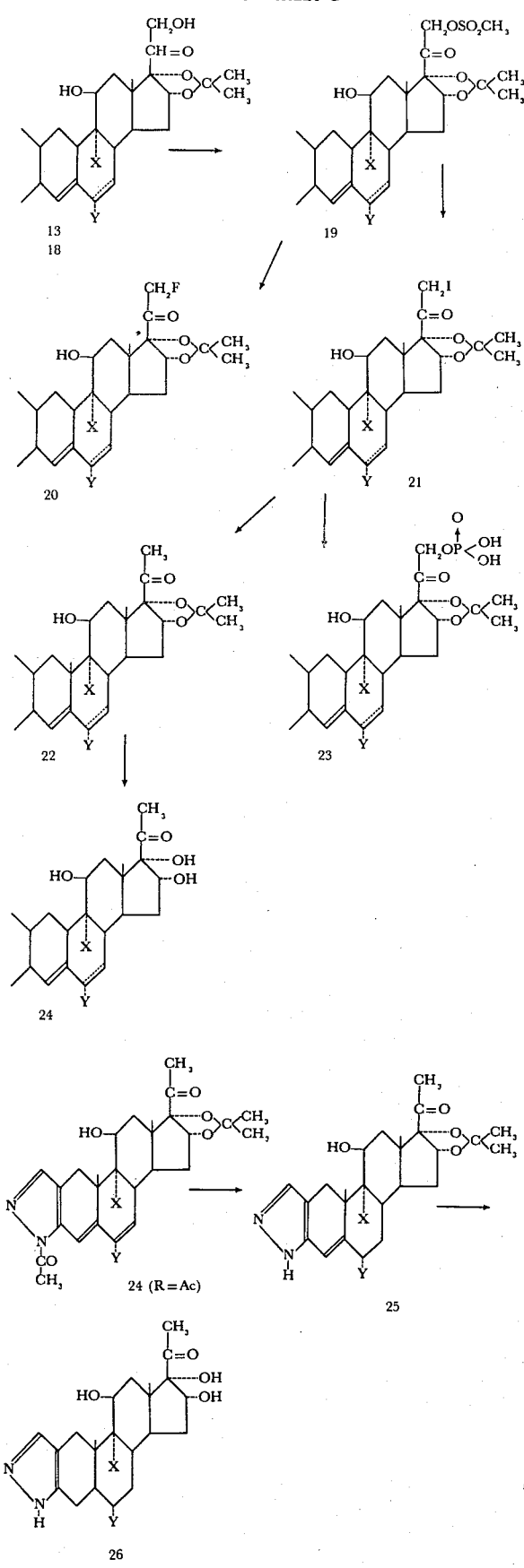

wherein the linkage indicated by the broken line between carbon atoms 6 and 7 indicates that a double bond may be present in this position, and wherein X is a member of the group consisting of hydrogen and fluoro, and Y is a member of the group consisting of methyl, fluoro and chloro.

*Example 1*

A suspension of 610 mg. of 20-ethylenedioxy-6α,9α difluoro-16α,17α,21-trihydroxy-4-pregnene-3-11-dione 21-acetate in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After two hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 20-ethylenedioxy-6α, 9α - difluoro-16α,17α,21-trihydroxy-2-hydroxymethylene-4-pregnene-3,11-dione, and/or formate esters thereof.

*Example 2*

A 25 mg. aliquot of 20-ethylenedioxy-6α,9α-difluoro-16α,17α,21 - trihydroxy - 2 - hydroxymethylene - 4 - pregnene-3,11-dione, and/or the formate esters thereof, is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride is filtered to remove insolubles and taken to dryness. It is redissolved in 3 ml. of methanol and 0.5 ml. of sodium methoxide in methanol and left under nitrogen for 10 minutes. The alkoxide is neutralized with acetic acid and the mixture is diluted with ethyl acetate and washed with water. Removal of the dried solvent leaves 20-ethylenedioxy-6α,9α-difluoro-16α,17α,21-trihydroxy-11-oxo-4-pregneno-[3,2-c]pyrazole.

*Example 3*

To a solution of 0.5 millimole of 20-ethylene-dioxy-6α,9α - difluoro - 16α,17α,21 - trihydroxy - 2 - hydroxymethylene-4-pregnene-3,11-dione, and/or the formate esters thereof, in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the product is removed by filtration. It is redissolved in 30 ml. of methanol and 5 ml. of sodium methoxide in methanol and left under nitrogen for 10 minutes. The alkoxide is neutralized with acetic acid and the mixture is diluted with ethyl acetate and washed with water. Removal of the dried solvent leaves N-methyl-20-ethylenedioxy-6α, 9α - difluoro - 16α,17α,21 - trihydroxy - 11 - oxo - 4 - pregneno-[3,2-c]pyrazoles.

A mixture of the 1'-methyl- and 2'-methyl-20-ethylenedioxy - 6α,9α - difluoro - 16α,17α,21 - trihydroxy - 11-oxo-4-pregneno-[3,2-c]pyrazole is prepared by the following route: A mixture of 1 gram of 20-ethylenedioxy - 6α,9α - difluoro - 16α,17α,21 - trihydroxy - 2 - hydroxy-methylene-4-pregnene-3,11-dione, and/or the formate esters thereof, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo to give the desired 20-ethylenedioxy-6α,9α-difluoro-16α,17α,21 - trihydroxy - 2 - methoxymethylene - 4 - pregnene-3,11-dione.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil or silica gel to yield the 1'-methyl- and the 2'-methyl-20-ethylenedioxy - 6α,9α - difluoro - 16α,17α,21 - trihydroxy-11-oxo-4-pregneno-[3,2-c]pyrazole.

The 20 - ethylenedioxy-6α,9α-difluoro-16α,17α,21-trihydroxy-N-methyl-11-oxo-4-pregneno-[3,2-c]pyrazoles may also be prepared by the following procedure: A solution of about 0.47 millimole of 20-ethylenedioxy-6α,9α-difluoro - 16α,17α,21 - trihydroxy - 11 - oxo - pregneno - [3,2-c]pyrazole in 10 ml. of benzene is treated with 30–38 mg. of about 51% sodium hydride (in oil suspension). After the addition of 2–3 ml. of dimethylformamide (dried over calcium hydride) and 5 ml. of methyl iodide the mixture is stirred at room temperature over night. The product is filtered, washed with methylene chloride, and the filtrate and washings are taken to dryness. The residue is treated with water and the product is filtered to give N-methyl-20-ethylenedioxy-6α,9α-difluoro - 16α,17α,21 - trihydroxy - 11 - oxo - 4 - pregneno-[3,2-c]pyrazole.

In accordance with the above procedures, by using other alkylating agents in place of methyl iodide, there are obtained the corresponding N-alkyl-20-ethylenedioxy-6α,9α - difluoro - 16α,17α,21 - trihydroxy - 11 - oxo - 4 - pregneno-[3,2-c]pyrazole.

In accordance with all of the above procedures but starting with the 2-hydroxymethylene derivatives of the compounds listed in column 2, there are obtained the corresponding 1'-methyl- and 2'-methyl derivatives.

*Example 4*

A mixture of 90 mg. of 20-ethylenedioxy-6α,9α-difluoro - 16α,17α,21 - trihydroxy - 2 - hydroxymethylene -4 - pregnene-3,11-dione, and its derived formates, and 0.028 ml. of phenylhydrazine is refluxed under nitrogen in 1.2 ml. of absolute ethanol for about 50 minutes. The reaction mixture is taken to dryness. Water is added and the product is filtered to give an amorphous solid. It is redissolved in 8 ml. of methanol and 2 ml. of 1 M sodium methoxide in methanol and left under nitrogen for 10 minutes. The alkoxide is neutralized with acetic acid and the mixture is diluted with ethyl acetate and washed with water. Removal of the dried solvent leaves 2' - phenyl - 20 - ethylenedioxy - 6α,9α - difluoro - 16α,17α,21-trihydroxy-11-oxo-4-pregneno-[3,2-c]pyrazole.

A mixture of the 1'-phenyl- and 2'-phenyl-20-ethylenedioxy-6α,9α - difluoro-16α,17α,21 - trihydroxy-11-oxo-4-pregneno-[3,2-c]pyrazole is prepared by the following route: A mixture of 1 gram of 20-ethylenedioxy-6α,9α-difluoro-16α,17α,21 - trihydroxy-2 - hydroxymethylene-4-pregnene-3,11 dione, and its derived formates, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 20- ethylenedioxy-6α,9α-difluoro - 16α,17α,21 - trihydroxy-2-methoxymethylene-4-pregnene-3,11-dione is obtained by chromatography on acid-washed alumina and elution with ether:chloroform mixtures.

A mixture of 500 mg. of the above 2-methoxy-methylene-steroid, 100 ml. of ethanol, and 1 ml. of phenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil[1] or silica gel to yield the 1'-phenyl- and 2'-phenyl-20-ethylenedioxy-6α,9α - difluoro - 16α,17α,21 - trihydroxy-11-oxo-4-pregneno-[3,2-c]pyrazole.

In accordance with the above procedures, but starting with the 2-hydroxymethylene-derivative which is obtained from each of the starting materials which are listed in column 2, there are obtained the corresponding 1'-phenyl- and 2'-phenyl-derivatives.

In accordance with the above procedures, but using other substituted hydrazines such as cyclohexylhydrazine, p-tolylhydrazine, p-chlorophenylhydrazine, p - methoxyphenylhydrazine, or benzylhydrazine in place of phenylhydrazine, there are obtained the corresponding 1'- and 2'-cyclohexyl-, 1'- and 2'-p-tolyl-, 1'- and 2'-(p-chlorophenyl)-, 1'- and 2'-(p-methoxyphenyl)-, and 1'- and 2'-benzyl-20-ethylenedioxy - 6α,9α - difluoro-16α,17α,21-trihydroxy-11-oxo-4-pregneno-[3,2-c]pyrazoles.

*Example 5*

A 111.5 mg. sample of 20-ethylenedioxy-6α,9α- difluoro-16α,17α,21 - trihydroxy-2 - hydroxymethylene - 4-pregnene-3,11-dione, and/or the formate esters thereof, is suspended in 2.5 ml. of ethanol and treated with 24.5 mg. of sodium acetate, followed by the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. It is redissolved in 12 ml. of methanol and 2.0 ml. of 1.33 N sodium methoxide in methanol and left under nitrogen for 10 minutes. The alkoxide is neutralized with acetic acid and the mixture is diluted with ethyl acetate and washed with water. Removal of the dried solvent and washed with water. Removal of the dried solvent leaves 2'-(p-fluorophenyl) - 20 - ethylenedioxy-6α,9α-difluoro-16α,17α,21 - trihydroxy-11 - oxo-4 - pregneno-[3,2-c]pyrazole.

A mixture of 1'-(p-fluorophenyl)- and 2'-(p-fluorophenyl)- 20-ethylenedioxy-6α,9α-difluoro - 16α,17α,21-trihydroxy-11-oxo-4-pregneno - [3,2-c]pyrazole is prepared by the following route: A mixture of 1 gram of 20-ethylenedioxy-6α,9α - difluoro - 16α,17α,21 - trihydroxy-

---

[1] Florisil is an activated magnesium silicate made according to U.S.P. 2,393,625.

2-hydroxymethylene-4-pregnene-3,11-dione, and/or the formate esters thereof, 200 ml. of methanol and 200 mg. of p-toluenesulfonic acid is left at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 20-ethylenedioxy-6α,9α-difluoro-16α,17α,21-trihydroxy-2-methoxymethylene-4-pregnene-3,11-dione is obtained by chromatography on acid washed alumina and elution with ether:chloroform mixtures.

A mixture of 500 mg. of the 2-methoxymethylene-derivative, 100 ml. of ethanol, and 1 ml. of p-fluorophenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl)- and 2'-(p-fluorophenyl)-20-ethylenedioxy-6α,9α-difluoro-16α,17α,21-trihydroxy-11-oxo-4-pregneno-[3,2-c]pyrazole.

In accordance with all of the above procedures, but starting with the 2-hydroxymethylene derivative which is obtained from each of the starting materials which are listed in column 2, there are obtained the corresponding 1'-(p-fluorophenyl)- and 2'-(p-fluorophenyl)-derivatives.

*Example 6*

Sodium borohydride (200 mg.) is added to a solution of 250 mg. of 20-ethylenedioxy-6α,9α-difluoro-16α,17α,21-trihydroxy-11-oxo-4-pregneno-[3,2-c]pyrazole, in 10 cc. of dimethyl formamide. After 18 hours, most of the solvent is removed in vacuo on a rotating evaporator, water is added and the product is collected by filtration. It is recrystallized from methanol to afford 20-ethylendioxy-6α,9α-difluoro-11β,16α,17α,21-tetrahydroxy-4-pregneno-[3,2-c]pyrazole.

*Example 7*

A mixture of 2.9 grams of 20-ethylenedioxy-6α,9α-difluoro-11β,16α,17α,21-tetrahydroxy-4-pregneno-[3,2-c]-pyrazole, 100 ml. of methanol, and 6 ml. of a solution prepared by diluting 8 ml. of sulfuric acid with 100 ml. of water is refluxed for one hour and then concentrated in vacuo. The product is extracted with ethyl acetate and the extract is washed wtih aqueous sodium bicarbonate, salt, and then wtaer. The mixture is dried over magnesium sulfate and then taken to dryness to give 6α,9α-difluoro-11β,16α,17α,21-tetrahydroxy-20-oxo-4-pregneno-[3,2-c]pyrazole.

*Example 8*

The 6α,9α-difluoro-11β,16α,17α,21-tetrahydroxy-20-oxo-4-pregneno-[3,2-c]pyrazole (100 mg.) is heated for 3 minutes with 10 ml. of acetone to which 1 drop of concentrated hydrochloric acid has been added and then letting stand at room temperature for 24 hours. The mixture is then poured into a dilute sodium bicarbonate solution and extracted wtih ethyl acetate. The extracts are washed, dried over magnesium sulfate and taken to dryness to give the 6α,9α-difluoro-11β,21-dihydroxy-16α,17α-isopropylidenedioxy-20-oxo-4-pregneno-[3,2-c]pyrazole.

In accordance with the above procedure, but starting with an N-alkyl-, N-cycloalkyl-, N-aryl-, or N-aralkyl-6α,9α-difluoro-11β,16α,17α,21-tetrahydroxy-20-oxo-4-pregneno-[3,2-c]pyrazole, there is obtained the corresponding N-alkyl-, N-cycloalkyl-, N-aryl- or N-aralkyl-6α,9α-difluoro-11β,21-dihydroxy-16α,17α-isopropylidenedioxy-20-oxo-4-pregneno-[3,2-c]pyrazole.

In accordance with the above procedure, but using an equivalent quantity of another ketone such as acetophenone, there is obtained the corresponding 16α,17α-ketal.

*Example 9*

The N-acetyl-6α,9α-difluoro-11β,21-dihydroxy-16α,17α-isopropylidenedioxy-20-oxo-4-pregneno-[3,2-c]pyrazole 21-acetate is prepared from the 6α,9α-difluoro-11β,16α,17α,21-tetrahydroxy-20-oxo-4-pregneno-[3,2-c]pyrazole by stirring 250 mg. of the steroid in 15 ml. of acetone containing 5 drops of 70% perchloric acid. After thirty minutes, aqueous sodium bicarbonate is added and the acetone is removed in vacuo. The residue is filtered off, air dried and then treated with 2 ml. of acetic anhydride and 2 ml. of pyridine for eighteen hours at room temperature. This acetylated mixture is taken off on a rotator at the oil pump. The residue is crystallized from a mixture of petroleum ether and ether to yield the N-acetyl-6α,9α-fluoro-11β,21-dihydroxy-16α,17α-isopropylidenedioxy-20-oxo-4-pregneno-[3,2-c]pyrazole 21-acetate.

A solution of 5.73 g. of the N-acetyl-6α,9α-difluoro-11β,21-dihydroxy-16α,17α-isopropylidenedioxy-20-oxo-4-pregneno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness in vacuo. The residue is dissolved in 150 ml. of acetone containing 2 ml. of 70% perchloric acid. After thirty minutes, aqueous sodium bicarbonate is added and the acetone is removed in vacuo. The product is extracted into chloroform which is washed with water, dried and removed in vacuo to yield after chromatography on neutral alumina 6α,9α-difluoro-11β,21-dihydroxy-16α,17α-isopropylidenedioxy-20-oxo-4-pregneno-[3,2-c]pyrazole 21-acetate.

In accordance with the above procedures, but using an equivalent quantity of another acylating agent in place of acetic anhydride, there is obtained the corresponding acyl derivatives.

In accordance with all the procedures given in Examples 1, 2, 3, 4, 5, 6, 7, 8 and 9, but starting in Example 1 with the 20-ethylenedioxy-16α,17α,21-trihydroxy-4-pregnene-3,11-dione 21-acetate or the 6α-chloro-, 6α-fluoro-, 6α-methyl-, 9α-fluoro-, 6α-chloro-9α-fluoro-, 6α-methyl-9α-fluoro-derivatives thereof, in place of the 6α,9α-difluoro-20-ethylenedioxy-16α,17α,21-trihydroxy-4-pregnene-3,11-dione 21-acetate, there is obtained the corresponding 11β,16α,17α-tetrahydroxy-20-oxo-4-pregneno-[3,2-c]pyrazole or the 6α-chloro, 6α-fluoro, 6α-methyl, 9α-fluoro, 6α-chloro-9α-fluoro or 9α-fluoro-6α-methyl-derivatives thereof; and the N-alkyl-, N-cycloalkyl-, N-aryl-, N-aralkyl-, N-heterocyclic derivatives, the 16α,17α-acetonides and the 21-acyloxy derivatives of all of the 16α,17α-acetonides of the foregoing 11β,16α,17α-tetrahydroxy-20-oxo-4-pregneno-[3,2-c]pyrazoles.

*Example 10*

6α,9α-difluoro-11β,21-dihydroxy-16α,17α-isopropylidenedioxy-20-oxo-4-pregneno-[3,2-c]pyrazole (500 mg.) is suspended in 25 ml. of 2,3-dihydropyran. A few drops of concentrated hydrochloric acid are added and magnetic stirring is continued for 6 hours, whereupon the solution is concentrated in vacuo. The residue is triturated with petroleum ether and recrystallized from a mixture of methylene chloride and petroleum ether or a mixture of ether and petroleum ether, to afford the 6α,9α-difluoro-11β-hydroxy-21-tetrahydropyranyloxy-16α,17α-isopropylidenedioxy-20-oxo-4-pregneno-[3,2-c]pyrazole.

In accordance with the above procedure, but starting with 11α,21 - dihydroxy-16α,17α-isopropylidenedioxy-20-oxo-4-pregneno-[3,2-c]pyrazole or the 6α-chloro-,6α-fluoro-, 6α-methyl-, 9α-fluoro-, 6α-chloro-9α-fluoro-, or 9α-fluoro-6α-methyl-derivative thereof, there is obtained the correspondingly substituted 11β-hydroxy-21-tetrahydropyranyloxy-16α,17α-isopropylidenedioxy - 20 - oxo-4-pregneno-[3,2-c]pyrazole.

*Example 11*

6,9α-difluoro - 11β,21 - dihydroxy - 16α,17α - isopropylidenedioxy-4,6-pregnadiene - 3,20 - dione 21-acetate (1.0 g.) is refluxed with a mixture of 1.0 g. of potassium bicarbonate in 10 ml. of water and 90 ml. of methanol. After 3 hours, most of the methanol is removed in vacuo and the product is extracted with ethyl acetate and water. Removal of the ethyl acetate affords crystals of 6,9α-difluoro-11β,21-dihydroxy - 16α,17α - isopropylidenedioxy-4,6-pregnadiene-3,20-dione.

*Example 12*

6,9α-difluoro - 11β,21 - dihydroxy - 16α,17α - isopropylidenedioxy-4,6-pregnadiene-3,20-dione (500 mg.) is suspended in 25 ml. of 2,3-dihydropyran. A few drops of concentrated hydrochloric acid are added and magnetic stirring is continued for 6 hours, whereupon the solution is concentrated in vacuo. The residue is triturated with petroleum ether and recrystallized from a mixture of methylene chloride and petroleum ether or a mixture of ether and petroleum ether, to afford the 6,9α-difluoro-21-tetrahydropyranyloxy-11β-hydroxy - 16α,17α - isopropylidenedioxy-4,6-pregnadiene-3,20-dione.

*Example 13*

The 6,9α-difluoro-21-tetrahydropyranyloxy - 11β - hydroxy-16α,17α-isopropylidenedioxy - 4,6 - pregnadiene-3,20-dione (350 mg.) is dissolved in 25 ml. of dry, hot benzene and the resulting solution is cooled to room temperature and treated with 1.0 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 6,9α - difluoro - 21 - tetrahydropyranyloxy-11β-hydroxy-2-hydroxymethylene - 16α,17α - isopropylidenedioxy-4,6-pregnadiene-3,20-dione, and/or the formate esters thereof.

*Example 14*

The 6,9α-difluoro-21-tetrahydropyranyloxy - 11β - hydroxy-2-hydroxymethylene - 16α,17α - isopropylidenedioxy-4,6-pregnadiene-3,20-dione, and/or the formate esters thereof, (565 mg.) is dissolved in 9.0 ml. of absolute ethanol and treated with a solution of hydrazine hydrate (60 mg., 1.2 equivalents) dissolved in 1.0 ml. of absolute ethanol. The mixture is refluxed in a nitrogen atmosphere for about 3 hours and then evaporated to dryness under reduced pressure. The residue is washed three times with cold water and the resulting amorphous solid is dried at 80° C. for 1 hour in high vacuum. It is redissolved in 30 ml. of methanol and 5 ml. of sodium methoxide in methanol and left under nitrogen for 10 minutes. The alkoxide is neutralized with acetic acid and the mixture is diluted with ethyl acetate and washed with water. Removal of the dried solvent leaves 6,9α-difluoro - 21 - tetrahydropyranyloxy-11β-hydroxy-16α,17α-isopropylidenedioxy - 20 - oxo-4,6-pregnadieno-[3,2-c]pyrazole.

*Example 15*

To a solution of 0.5 millimole of 6,9α-difluoro-21-tetrahydropyranyloxy - 11β - hydroxy-2-hydroxymethylene-16α,17α-isopropylidenedioxy-4,6-pregnadiene - 3,20 - dione, and/or the formate esters thereof, in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves N-methyl-6,9α-difluoro - 21 - tetrahydropyranyloxy-11β-hydroxy-16α,17α-isopropylidenedioxy - 20 - oxo - 4,6-pregnadieno-[3,2-c]pyrazole.

A mixture of 1'-methyl- and 2'-methyl-6,9α-difluoro-21 - tetrahydropyranyloxy - 11β - hydroxy - 16α,17α - isopropylidenedioxy-20-oxo - 4,6 - pregnadieno-[3,2-c]pyrazole is prepared by the following route: One gram of 6,9α-difluoro - 21 - tetrahydropyranyloxy-11β-hydroxy-2-hydroxymethylene - 16α,17α - isopropylidenedioxy - 4,6-pregnadiene-3,20-dione, and/or the formate esters thereof, in 50 ml. of dry dioxane is treated with excess ethereal diazomethane for one hour. The reaction mixture is taken to near dryness in vacuo, ethyl acetate is added and the organic layer is washed two times with 2 N aqueous sodium hydroxide solution and then with water. The ethyl acetate extract is then dried and concentrated in vacuo. The 6,9α-difluoro-21-tetrahydropyranyloxy - 11β - hydroxy - 2 - methoxy - methylene-16α,17α-isopropylidenedioxy - 4,6 - pregnadiene-3,20-dione is obtained by chromatography on silica gel.

A mixture of 580 mg. of the above 2-methoxymethylene-derivative, 10 ml. of ethanol, and 56 mg. (1.2 equivalents) of methylhydrazine is heated under nitrogen for three hours and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel to yield the 1'-methyl- and the 2'-methyl-6,9α-difluoro - 21-tetrahydropyranyloxy-11β-hydroxy-16α,17α-isopropylidenedioxy - 20-oxo-4,6-pregnadieno-[3,2-c]pyrazole.

A mixture of the 1'-methyl and the 2'-methyl-6,9α-difluoro - 21 - tetrahydropyranyloxy-11β-hydroxy-16α,17α-isopropylidenedioxy - 20-oxo-4,6-pregnadieno-[3,2-c]pyrazoles may also be prepared by the following procedure: A solution of about 0.47 millimole of 6,9α-difluoro-21-tetrahydropyranyloxy - 11β-hydroxy-16α,17α-isopropylidenedioxy-20-oxo-4,6-pregnadieno-[3,2-c]pyrazole in 10 ml. of benzene is treated with 30–38 mg. of about 51% sodium hydride (in oil suspension) after the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue may be chromatographed on silica gel or Florisil to yield the 1'- and 2'-methyl-6,9α-difluoro - 21-tetrahydropyranyloxy-11β-hydroxy-16α,17α- isopropylidenedioxy - 20-oxo-4,6-pregnadieno-[3,2-c]pyrazoles.

In accordance with the above procedures, but using other alkylating agents in place of methyl iodide, there are obtained the corresponding N-alkyl-6,9α-difluoro-21-tetrahydropyranyloxy - 11β-hydroxy-16α,17α-isopropylidenedioxy-20-oxo-4,6-pregnadieno-[3,2-c]pyrazoles.

In accordance with all of the above procedures, but starting with the 2-hydroxymethylene derivatives of the compounds listed on pages 3–4, there are obtained the corresponding 1'-methyl- and 2'-methyl derivatives.

Example 16

A mixture of 565 mg. of 6,9α-difluoro-21-tetrahydropyranyloxy - 11β-hydroxy-2-hydroxymethylene-16α,17α-isopropylidenedioxy - 4,6-pregnadiene-3,20-dione and/or the formate esters thereof, and 130 mg. (1.2 equivalents) of phenylhydrazine are refluxed under nitrogen in 8 ml. of absolute ethanol for about three hours. The reaction mixture is taken to dryness. Water is added and the product is filtered to given an amorphous solid, which is washed successively with water, dilute acid, water, and petroleum ether. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-phenyl-6,9α-difluoro-21-tetrahydropyranyloxy - 11β - hydroxy-16α,17α-propylidenedioxy-20-oxo-4,6-pregnadieno-[3,2-c]pyrazole.

A mixture of the 1'-phenyl- and 2'-phenyl-6,9α-difluoro-21 - tetrahydropyranyloxy-11β-hydroxy-16α,17α-propylidenedioxy-20-oxo-4,6-pregnadieno-[3,2-c]pyrazole is prepared by the following route: One gram of 6,9α-difluoro-21 - tetrahydropyranyloxy-11β-hydroxy-2-hydroxymethylene - 16α,17α - isopropylidenedioxy-6-methyl-4,6-pregnadiene-3,20-dione, and/or the formate esters thereof, in 50 ml. of dry dioxane is treated with excess ethereal diazomethane for one hour. The reaction mixture is taken to near dryness in vacuo, ethyl aceate is added and the organic layer is washed two times with 2 N aqueous sodium hydroxide solution and then with water. The ethyl acetate extract is then dried and concentrated in vacuo.

The 6,9α - difluoro-21-tetrahydropyranyloxy-11β-hydroxy - 2 - methoxymethylene-16α,17α-isopropylidenedioxy-4,6-pregnadiene-3,20-dione is obtained by chromatography on silica gel.

A mixture of 580 mg. of the above 2-methoxymethylene-steriod, 10 ml. of ethanol and 130 mg. (1.2 equivalents) of phenylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel or Florisil to yield the 1'-phenyl- and 2'-phenyl-6,9α-difluoro - 21 - tetrahydropyranyloxy-11β-hydroxy-16α,17α - propylidenedioxy-20-oxo-4,6-pregnadieno-[3,2-c]-pyrazole.

In accordance with the above procdures, but starting with the 2-hydroxymethylene-derivative which is obtained from each of the starting materials which are listed in column 2, there are obtained the corresponding 1'-phenyl- and 2'-phenyl-derivatives.

In accordance with the above procedures, but using other substituted hydrazines, for example, cyclohexylhydrazine, p-tolylhydrazine, p-chlorophenyl-hydrazine, p-methoxyphenylhydrazine, or benzylhydrazine in place of phenylhydrazine, there are obtained the corresponding 1'- and 2'-cyclohexyl-, 1'- and 2'-p-tolyl-, 1'- and 2'-p-chlorophenyl-, 1'- and 2'-p-methoxyphenyl-, and 1'- and 2' - benzyl - 6,9α - difluoro-21-tetrahydropyranyloxy-11β-hydroxy - 16α,17α - propylidenedioxy-20-oxo-4,6-pregnadieno-[3,2-c]pyrazoles.

Example 17

565 mg. sample of 6,9α-difluoro-21-tetrahydropyranyloxy-11β-hydroxy - 2 - hydroxymethylene - 16α,17α - isopropylidenedioxy-4,6-pregnadiene-3,20-dione and/or the formate esters thereof is suspended in 10 ml. of ethanol and treated with 100 mg. (1.2 equivalents) of sodium acetate, followed with the addition of 195 mg. (1.2 equivalents) of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-(p-fluorophenyl)-6,9α-difluoro - 21 - tetrahydropyranyloxy - 11β - hydroxy-16α,17α-isopropylidenedioxy - 20-oxo - 4,6 - pregnadieno-[3,2-c]pyrazole.

A mixture of 1'-(p-fluorophenyl)- and 2'-(p-fluorophenyl) - 6,9α - difluoro - 21 - tetrahydropyranyloxy-11β-hydroxy-16α,17α-isopropylidenedioxy - 20 - oxo - 4,6-pregnadieno-[3,2-c]pyrazole is prepared by the following route: One gram of 6,9α-difluoro-21-tetrahydropyranyloxy - 11β - hydroxy-2-hydroxymethylene-16α,17α-isopropylidenedioxy-4,6-pregnadiene-3,20-dione, and/or the formate esters thereof, in 50 ml. of dry dioxane is treated with excess etheral diazomethane for one hour. The reaction mixture is taken to near dryness in vacuo, ethyl acetate is added and the organic layer is washed two times with 2 N aqueous sodium hydroxide solution and then with water. The ethyl acetate extract is then dried and concentrated in vacuo. The 6,9α-difluoro-21tetrahydropyranyloxy-11β-hydroxy-2-methoxymethylene - 16α,17α - isopropylidenedioxy-4,6-pregnadiene-3,20-dione is obtained by chromatography on neutral alumina.

A mixture of 500 mg. of the 2-methoxymethylene-derivatives 100 ml. of ethanol, and 1 ml. of p-fluorophenylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on neutral alumina to afford the 1'-(p-fluorophenyl) and 2'-(p-fluorophenyl)-6,9α-difluoro-21-tetrahydropyranyloxy - 11β - hydroxy-16α,17α-isopropylidenedioxy - 20 - oxo - 4,6 - pregnadieno-[3,2-c] pyrazole.

In accordance with all of the above procedures, but starting with the 2-hydroxymethylene derivative which is obtained from each of the starting materials which are listed in column 2, there are obtained the corresponding 1'-(p-fluorophenyl)- and 2'-(p-fluorophenyl)-derivatives.

In accordance with the above procedure, but using each of the monosubstituted hydrazines listed in column 3, there is obtained the corresponding 1'- and 2'-substituted derivatives of the above 6,9α-difluoro-21-tetrahydropyranyloxy-11β-hydroxy - 16α,17α - isopropylidenedioxy-20-oxo-4,6-pregnadieno-[3,2-c]pyrazole.

Example 18

The 6,9α - difluoro - 21 - tetrahydropyranyloxy-11β-hydroxy-16α,17α-isopropylidenedioxy-20-oxo - 4,6 - pregnadieno-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed in vacuo and the residue treated with 3 ml. of ethyl acetate. The insoluble material is filtered off and the organic layer is washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry filtered and dried in vacuo to give 23.0 mg. of 6,9α-difluoro-11β,21-dihydroxy-16α,17α-isopropylidenedioxy-20 - oxo - 4,6 - pregnadieno-[3,2-c]pyrazole.

In accordance with the above procedure, but starting with an N-alkyl-, N-cycloalkyl-, N-aryl-, N-acyl-, or N-aralkyl-6,9α-difluoro-21-tetrahydropyranyloxy-11β-hydroxy-16α,17α-isopropylidenedioxy-20 - oxo - 4,6 - pregnadieno-[3,2-c]pyrazole, there is obtained the corresponding substituted - 6,9α - difluoro-11β,21-dihydroxy-16α,17α-isopropylidenedioxy-20-oxo-4,6-pregnadieno-[3,2-c]pyrazole.

*Example 19*

To a solution of 100 mg. of 6,9α-difluoro-11β,21-dihydroxy - 16α,17α - isopropylidenedioxy-20-oxo-4,6-pregnadieno[3,2-c]pyrazole in 2 ml. of pyridine is added 2 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid, saturated aqueous sodium bicarbonate and water (until the aqueous layer is neutral). The ethyl acetate solution is dried with anhydrous sodium sulfate. The solvent is then distilled at about 40° C. in vacuo to afford the N-acetyl-6,9α-difluoro-11β,21-dihydroxy - 16α,17α - isopropylidenedioxy - 20 - oxo-4,6-pregnadieno-[3,2-c]pyrazole 21-acetate which is isolated by the addition of water and filtration.

A solution of 5.73 g. of N - acetyl - 6,9α - difluoro - 11β, 21 - dihydroxy-16α,17α-isopropylidenedioxy-20-oxo-4,6-pregnadieno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness in vacuo.

This residue is dissolved in 150 ml. of acetone containing 2 ml. of 70% perchloric acid. After thirty minutes, aqueous sodium bicarbonate is added and the acetone is removed in vacuo. The product is extracted into chloroform which is washed with water, dried and removed to yield, after chromatography on neutral alumina, 6,9α - difluoro-11β,21-dihydroxy-16α,17α-isopropylidenedioxy-20-oxo-4,6-pregnadieno-[3,2-c]pyrazole 21-acetate.

In accordance with the above procedures but using an equivalent quantity of another acylating agent in place of acetic anhydride, there is obtained the corresponding acyl derivatives.

*Example 20*

6,9α - difluoro - 11β,21 - dihydroxy - 16α,17α - isopropylidenedioxy - 20 - oxo-4,6-pregnadieno-[3,2-c]pyrazole (1.5 g.) is added to 150 ml. of refluxing 60% formic acid. After twenty minutes, the solution is cooled and then poured into ice and water. After 18 hours, the 6,9α-difluoro - 11β,16α,17α,21-tetrahydroxy-20-oxo-4,6-pregnadieno - [3,2-c]pyrazole is collected by filtration and dried.

In accordance with the above procedure, but starting with the corresponding N-alkyl-, N-cycloalkyl-, N-aryl-, or N-aralkyl-, 6,9α-difluoro-11β,21-dihydroxy-16α,17α-isopropylidenedioxy - 20-oxo-4,6-pregnadieno-[3,2-c]pyrazole, there is obtained the corresponding N-alkyl-, N-cycloalkyl-, N-aryl-, or N-aralkyl-6,9α-difluoro-11β,16α,17α,21 - tetrahydroxy-20-oxo-4,6-pregnadieno-[3,2-c]pyrazole.

In accordance with all the procedures given in Examples 11, 12, 13, 14, 15, 16, 17, 18, 19 and 20, but starting in Example 11 with the 11β,21-dihydroxy-16α,17α-isopropylidenedioxy - 4,6-pregnadiene-3,20-dione 21-acetate, or the 6-chloro-, 6-fluoro-, 6-methyl-, 9α-fluoro-, 6-chloro-9α-fluoro-, 9α-fluoro-6-methyl- derivative thereof, in place of the 6,9α-difluoro-11β,21-dihydroxy - 16α,17α-isopropylidenedioxy - 4,6-pregnadiene-3,20-dione 21 - acetate, there is obtained the corresponding 11β,16α,17α,21-tetrahydroxy - 20-oxo-4,6-pregnadieno-[3,2-c]pyrazole or the 6-chloro-, 6-fluoro-, 6-methyl-, 9α-fluoro-, 6-chloro-9α-fluoro- or 9α-fluoro-6-methyl-derivative thereof; and the N-alkyl-, N-cycloalkyl-, N-aryl-, N-aralkyl-derivatives, the 16α,17α - acetonides and the 21-acyloxy derivative of all of the foregoing 16α,17α-acetonides, 11β,16α,17α-tetrahydroxy - 20-oxo-4,6-pregnadieno-[3,2-c]pyrazoles.

*Example 21*

To a solution of 100 mg. of 6,9α-difluoro-21-tetrahydropyranyloxy - 11β-hydroxy-16α,17α - isopropylidenedioxy - 20-oxo-4,6-pregnadieno-[3,2-c]pyrazole in 2 ml. of pyridine is added 2 ml. of acetic anhydride. The mixture is allowed to stand over night at room temperature. It is taken to dryness in vacuo to afford the N-acetyl-6,9α-difluoro - 21-tetrahydropyranyloxy-11β-hydroxy-16α,17α-isopropylidenedioxy - 20 - oxo-4,6-pregnadieno-[3,2-c]pyrazole.

Without further purification, this substance is dissolved in 5 ml. of methanol containing 20 mg. of p-toluenesulfonic acid. The mixture is kept at room temperature for 4 hours. The solvent is removed in vacuo, ethyl acetate is added and the organic layer is washed several times with dilute sodium bicarbonate. The dried solvent is removed to yield after chromatography on neutral alumina N-acetyl - 6,9α - difluoro-11β,21-dihydroxy-16α,17α-isopropylidenedioxy - 20 - oxo-4,6-pregnadieno-[3,2-c]pyrazole.

*Example 22*

To a solution of 85 mg. of N-acetyl-6,9α-difluoro-11β, 21 - dihydroxy-16α,17α-isopropylidenedioxy-20-oxo-4,6-pregnadieno -[3,2-c]pyrazole in 0.5 ml of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, dried and removed to give N-acetyl-6,9α-difluoro-11β,21-dihydroxy-16α,17α - isopropylidenedioxy - 20 - oxo-4,6-pregnadieno-[3,2-c]pyrazole 21-mesylate.

In accordance with the above procedure, but starting with the N-alkyl-, N-cycloalkyl-, N-aryl-, or N-aralkyl-6α,9α - difluoro-11β,21-dihydroxy-16α,17α-isopropylidenedioxy-20-oxo-4,6-pregnadiene-[3,2-c]pyrazole, in place of the N-acyl-derivative there is obtained the corresponding 21-mesylate.

*Example 23*

To 180 mg. of N-acetyl-6,9α-difluoro-11β,21-dihydroxy-16α,17α - isopropylidenedioxy-20-oxo-4,6 - pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords N-acetyl-6,9α-difluoro-11β-hydroxy - 21- iodo - 16α,17α - isopropylidenedioxy-20-oxo-4,6-pregnadieno-[3,2-c]pyrazole.

Example 24

The N-acetyl-6,9α-difluoro-11β-hydroxy-21-iodo-16α,17α - isopropylidenedioxy - 20 - oxo - 4,6 - pregnadieno-[3,2-c]pyrazole (100 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate in vacuo, the residue is left overnight under nitrogen in 5 ml. of methanol and 1 ml. of one molar sodium methoxide in methanol. The solvent is then removed in vacuo, ethyl acetate is added and, after a water wash, the solvent is dried and removed. Chromatography of the residue on neutral alumina affords some 6,9α-difluoro-11β - hydroxy - 16α,17α - isopropylidenedioxy - 20 - oxo-4,6-pregnadieno-[3,2-c]pyrazole.

Example 25

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N - acetyl - 6,9α - difluoro - 11β - hydroxy - 21 - iodo-16α,17α - isopropylidenedioxy - 20 - oxo - 4,6 - pregnadieno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed in vacuo at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated in vacuo to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-acetyl-6,9α-difluoro-11β - hydroxy - 16α,17α - isopropylidenedioxy - 20 - oxo-4,6-pregnadieno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

Example 26

To a solution of 62 mg. of N-acetyl-6,9α-difluoro-11β,21 - dihydroxy - 16α,17α - isopropylidenedioxy - 20 - oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-11β-hydroxy-16α-methyl-20-oxo-2'-pheneyl-4-pregneno - [3,2-c]pyrazole and 21-fluoro-11β,17α - dihydroxy - 16α - methyl - 20 - oxo - 2' - phenyl - 4-pregneno-[3,2-c]pyrazole, which compounds are separated by partition chromatography, or by chromatography on silica gel.

Example 27

N - acetyl - 6,9α - difluoro - 11β - hydroxy - 16α,17α-isopropylidenedioxy - 20 - oxo - 4,6 - pregnadieno-[3,2-c]pyrazole (60 mg.) is treated under nitrogen with 1.0 ml. of one molar sodium methoxide in 10 ml. of methanol. After 1 hour, the methanol is removed in vacuo and the product is extracted with ethyl acetate and washed with water. Removal of the dried ethyl acetate affords 6,9α-difluoro - 11β - hydroxy - 16α,17α - isopropylidenedioxy-20-oxo-4,6-pregnadieno-[3,2-c]pyrazole.

Example 28

6,9α - difluoro - 11β - hydroxy - 16α,17α - isopropylidenedioxy - 20 - oxo - 4,6 - pregnadieno - [3,2-c]pyrazole (1.5 g.) is added to 150 ml. of refluxing 60% formic acid. After twenty minutes, the solution is cooled and then poured into ice and water. After 18 hours, the 6,9α - difluoro - 11β,16α,17α - trihydroxy - 20 - oxo - 4,6-pregnadieno-[3,2-c]pyrazole is collected by filtration and dried.

In accordance with all the procedures given in Examples 21, 22, 23, 24, 25, 26, 27, and 28, but starting in Example 21 with the 11β-hydroxy-21-tetrahydropyranyloxy - 16α,17α - isopropylidenedioxy - 20 - oxo - 4 - pregneno-[3,2-c]pyrazole or the 6α-chloro-, 6α-fluoro-, 6α-methyl-, 9α-fluoro-, 6α,9α-difluoro-, 6α-chloro-9α-fluoro-, 6α-methyl-9α-fluoro-derivative thereof; or the 11β-hydroxy - 21 - tetrahydropyranyloxy - 16α,17α - isopropylidenedioxy-20-oxo-4,6-pregnadieno-[3,2-c]pyrazole or the 6-chloro-, 6-fluoro-, 6-methyl-, 9α-fluoro-, 6-chloro-9α-fluoro-, 9α-fluoro-6α-methyl-derivative thereof, there is obtained the corresponding 6α-chloro-, 6α-fluoro-, 9α-fluoro-, 6α,9α-difluoro-, 6α-chloro-9α-fluoro-, 6α-methyl- or 9α - fluoro - 6α - methyl - 11β,16α,17α - trihydroxy - 20-oxo-4-pregneno-[3,2-c]pyrazole; or the 6-chloro-, 6-fluoro-, 6-methyl-, 9α-fluoro-6-chloro-9α-fluoro or 9α-fluoro-6 - methyl - 11β,16α,17α - trihydroxy - 20 - oxo - 4,6-pregnadieno-[3,2-c]pyrazole, and the 16α,17α-acetonides of all of the foregoing compounds.

In accordance with all the procedures given in Examples 22, 23, 24, 25, 26 and 28, but starting in Example 22 with an N-alkyl-, N-cycloalkyl-, N-aryl-, or N-aralkyl-11β - hydroxy - 21 - tetrahydropyranyloxy - 16α,17α - isopropylidenedioxy-20-oxo-4-pregneno-[3,2-c]pyrazole or the 6α-chloro-, 6α-fluoro-, 6α-methyl-, 9α-fluoro-, 6α,9α-difluoro-, 6α-chloro-9α-fluoro-, 9α-fluoro-6α-methyl-derivative thereof; or the N-alkyl-, N-cycloalkyl-, N-aryl- or N-aralkyl - 11β - hydroxy - 21 - tetrahydropyranyloxy-16α,17α - isopropylidenedioxy - 20 - oxo - 4,6 - pregnadieno-[3,2-c]pyrazole or the 6-chloro-, 6-fluoro-, 6-methyl-, 9α-fluoro-, 6-chloro-9α-fluoro-, 9α-fluoro-6-methyl, derivatives thereof, there is obtained the corresponding 6α-chloro-, 6α-fluoro-, 6α-methyl-, 9α-fluoro-, 6α,9α-difluoro-, 6α-chloro-9α-fluoro-, or 9α-fluoro-6α-methyl-, N-alkyl-, N-cycloalkyl-, N-aryl-, or N-aralkyl-, 11β,16α,17α-trihydroxy-20-oxo-4-pregneno-[3,2-c]pyrazole; or the 6-chloro-, 6-fluoro-, 6α-chloro-9α-fluoro-, or 9α-fluoro-6-methyl-N-alkyl-, N-cycloalkyl-, N-aryl- or N-aralkyl-11β,16α,17α-trihydroxy-20-oxo-4,6-pregnadieno-[3,2-c]pyrazole, and the 16α,17α-acetonides of all of the foregoing compounds.

Example 29

The 6,9α - difluoro - 21 - tetrahydropyranyloxy - 11β-hydroxy - 16α,17α - isopropylidenedioxy - 20 - oxo - 2'-phenyl - 4,6 - pregnadieno - [3,2 - c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed in vacuo and the residue treated with 3 ml. of ethyl acetate. The insoluble material is filtered off and the organic layer is washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried in vacuo to give 23.0 mg. of 6α,9α - difluoro - 11β,21 - dihydroxy - 16α,17α - isopropylidenedioxy - 20 - oxo - 2' - phenyl - 4,6 - pregnadieno-[3,2-c]pyrazole.

To a solution of 85 mg. of 6,9α-difluoro-11β,21-dihydroxy - 16α,17α - isopropylidenedioxy - 20 - oxo - 2'-phenyl-4,6-pregnadieno-[3,2-c]pyrazole in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, dried and removed to give 6,9α-difluoro-11β, 21 - dihydroxy - 16α,17α - isopropylidenedioxy - 20 - oxo-2'-phenyl - 4,6 - pregnadieno - [3,2 - c]pyrazole 21-mesylate.

To 180 mg. of 6,9α-difluoro-11β,21-dihydroxy-16α,17α-isopropylidenedioxy - 20 - oxo - 2' - phenyl - 4,6 - pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords 6,9α-difluoro-11β-hydroxy-21 - iodo - 16α,17α - isopropylidenedioxy - 2' - phenyl - 20-oxo-4,6-pregnadieno-[3,2-c]pyrazole.

The 6,9α - difluoro - 11β - hydroxy - 21 - iodo - 16α, 17α - isopropylidenedioxy - 20 - oxo - 2' - phenyl - 4,6-pregnadieno-[3,2-c]pyrazole (100 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate in vacuo, the residue is left over night under nitrogen in 5 ml. of methanol and 1 ml. of one molar sodium methoxide in methanol. The solvent is then removed in vacuo, ethyl acetate is added and, after a water wash, the solvent is dried and removed. Chromatography of the residue on neutral alumina affords 6,9α - difluoro - 11β - hydroxy - 16α,17α - isopropylidenedioxy-20-oxo-2'-phenyl-4,6-pregnadieno-[3,2-c]pyrazole.

6,9α - difluoro - 11β - hydroxy - 16α,17α - isopropylidenedioxy - 20 - oxo - 2' - phenyl - 4,6 - pregnadieno-[3,2-c]pyrazole (1.5 g.) is added to 150 ml. of refluxing 60% formic acid. After twenty minutes, the solution is cooled and then poured into ice and water. After 18 hours, the 6,9α-difluoro-11β,16α,17α-trihydroxy-20-oxo-2'-phenyl-4,6-pregnadieno-[3,2-c]pyrazole is collected by filtration and dried.

*Example 30*

11β,21 - dihydroxy - 16α,17α - isopropylidenedioxy-6-methyl-4,6-pregnadiene-3,20-dione 21-acetate (1.0 g.) is refluxed with a mixture of 1.0 g. of potassium bicarbonate in 10 ml. of water and 90 ml. of methanol. After 3 hours most of the methanol is removed in vacuo and the product is extracted with ethyl acetate and water. Removal of the ethyl acetate affords crystals of 11β,21-dihydroxy-16α, 17α - isopropylidenedioxy - 6 - methyl - 4,6 - pregnadiene-3,20-dione.

11β,21 - dihydroxy - 16α,17α - isopropylidenedioxy-6-methyl - 4,6 - pregnadiene - 3,20 - dione (500 mg.) is suspended in 25 ml. of 2,3-dihydropyran. A few drops of concentrated hydrochloric acid is added and magnetic stirring is continued for 6 hours, whereupon the solution is concentrated in vacuo. The residue is triturated with petroleum ether and recrystallized from a mixture of methylene chloride and petroleum ether or a mixture of ether and petroleum ether, to afford the 21-tetrahydropyranyloxy - 11β - hydroxy - 16α,17α - isopropylidenedioxy - 6 - methyl - 4,6 - pregnadiene - 3,20 - dione.

The 21-tetrahydropyranyloxy-11β-hydroxy-16α,17α-isopropylidenedioxy - 6 - methyl - 4,6 - pregnadiene - 3,20-dione (350 mg.) is dissolved in 25 ml. of dry, hot benzene and the resulting solution is cooled to room temperature and treated with 1.0 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 21-tetrahydropyranyloxy - 11β - hydroxy - 2 - hydroxymethylene - 16α, 17α - isopropylidenedioxy - 6 - methyl - 4,6 - pregnadiene-3,20-dione, and/or the formate esters thereof.

A mixture of 565 mg. of 21-tetrahydropyranyloxy-11β-hydroxy - 2 - hydroxymethylene - 16α,17α - isopropylidenedioxy - 6 - methyl - 4,6 - pregnadiene - 3,20 - dione and/or the formate esters thereof, and 130 mg. (1.2 equivalents) of phenylhydrazine are refluxed under nitrogen in 8 ml. of absolute ethanol for about three hours. The reaction mixture is taken to dryness. Water is added and the product is filtered to give an amorphous solid, which is washed successively with water, dilute acid, water, and petroleum ether. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-phenyl-21-tetrahydropyranyloxy - 11β - hydroxy - 6 - methyl - 16α,17α - propylidenedioxy-20-oxo-4,6-pregnadieno-[3,2-c]pyrazole.

A mixture of the 1'-phenyl- and 2'-phenyl-21-tetrahydropyranyloxy - 11β - hydroxy - 6 - methyl - 16α,17α - propylidenedioxy-20-oxo-4,6-pregnadieno-[3,2-c]pyrazole is prepared by the following route: One gram of 21-tetrahydropyranyloxy - 11β - hydroxy - 2 - hydroxymethylene-16α,17α - isopropylidenedioxy - 6 - methyl - 4,6 - pregnadiene-3,20-dione, and/or the formate esters thereof, in 50 ml. of dry dioxane is treated with excess ethanol diazomethane for one hour. The reaction mixture is taken to near dryness in vacuo, ethyl acetate is added and the organic layer is washed two times with 2 N aqueous sodium hydroxide solution and then with water. The ethyl acetate extract is then dried and concentrated in vacuo. The 21 - tetrahydropyranyloxy - 11β - hydroxy-2 - methoxymethylene - 16α,17α - isopropylidenedioxy - 6-methyl-4,6-pregnadiene-3,20-dione is obtained by chromatography on silica gel.

A mixture of 580 mg. of the above 2-methoxymethylene-steroid, 10 ml. of ethanol, and 130 mg. (1.2 equivalents) of phenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel or Florisil to yield the 1'-phenyl- and 2'-phenyl-21-tetrahydropyranyloxy - 11β - hydroxy - 6 - methyl - 16α, 17α - propylidenedioxy - 20 - oxo - 4,6 - pregnadieno-[3,2-c]pyrazole.

The 6 - methyl - 21 - tetrahydropyranyloxy - 11β - hydroxy - 16α,17α - isopropylidenedioxy - 20 - oxo - 4,6-pregnadieno-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed in vacuo and the residue treated with 3 ml. of ethyl acetate. The insoluble material is filtered off and the organic layer is washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried in vacuo to give 23.0 mg. of 6-methyl-11β,21-dihydroxy-16α,17α - isopropylidenedioxy - 20 - oxo - 4,6 - pregnadieno-[3,2-c]pyrazole.

The 11β,21 - dihydroxy - 16α,17α - isopropylidenedioxy - 6 - methyl - 20 - oxo - 2' - phenyl - 4,6 - pregnadieno-[3,2-c]pyrazole is treated with a mixtrue of 1.5 ml. of pyridine and 1.5 ml. of acetic anhydride and the mixture is allowed to stand at room temperature over night. The solvents are removed in vacuo, water is added and the 11β,21 - dihydroxy - 16α,17α - isopropylidenedioxy - 6-methyl - 20 - oxo - 2' - phenyl - 4,6 - pregnadieno-[3,2-c]-pyrazole 21-acetate is removed by filtration. After drying, the compound is dissolved in methylene chloride, a few drops of 2.5 N HCl are added and the mixture is taken to dryness. The resulting 11β,21-dihydroxy-16α,17α - isopropylidenedioxy - 6 - methyl - 20 - oxo - 2'-phenyl - 4,6 - pregnadieno - [3,2 - c]pyrazole 21 - acetate hydrochloride is recrystallized.

11β,21 - dihydroxy - 16α,17α - isopropylidenedioxy - 6-methyl - 20 - oxo - 2' - phenyl - 4,6 - pregnadieno-[3,2-c]-pyrazole (1.5 g.) is added to 150 ml. of refluxing 60% formic acid. After twenty minutes, the solution is cooled and then poured into ice and water. After 18 hours the 11β,16α,17α,21 - tetrahydroxy - 6 - methyl - 20 - oxo - 2'-phenyl-4,6-pregnadieno-[3,2-c]pyrazole is collected by filtration and dried.

To a solution of 85 mg. of 11β,21-dihydroxy-16α,17α-isopropylidenedioxy-6-methyl-20-oxo-2'-phenyl-4,6 - pregnadieno-[3,2-c]pyrazole in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, dried and removed to give 11β,21-dihydroxy-16α,17α-isopropylidenedioxy-6-methyl-20-oxo-2'-phenyl-4,6 - pregnadieno - [3,2-c]pyrazole 21-mesylate.

To 180 mg. of 11β,21-dihydroxy-16α,17α-isopropylidenedioxy-6-methyl-20-oxo-2'-phenyl - 4,6 - pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords 11β-hydroxy-21-iodo-16α,17α-isopropylidenedioxy-6-methyl-20-oxo-2'-phenyl-4,6 - pregnadieno-[3,2-c]pyrazole.

The 11β-hydroxy-21-iodo-16α,17α-isopropylidenedioxy-6-methyl - 20 - oxo-2'-phenyl - 4,6 - pregnadieno-[3,2-c]-pyrazole (100 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate in vacuo, the residue is left overnight under nitrogen in 5 ml. of methanol and 1 ml. of one molar sodium methoxide in methanol. The solvent is then removed in vacuo, ethyl acetate is added and, after a water wash, the solvent is dried and removed. Chromatography of the residue on neutral alumina affords some 11β-hydroxy-16α,17α-isopropylidenedioxy-6-methyl-20-oxo-2' - phenyl-4,6-pregnadieno-[3,2-c]pyrazole.

11β-hydroxy-16α,17α-isopropylidenedioxy - 6 - methyl-20-oxo-2'-phenyl-4,6-pregnadieno-[3,2-c]pyrazole (1.5 g.) is added to 150 ml. of refluxing 60% formic acid. After twenty minutes, the solution is cooled and then poured into ice and water. After 18 hours, the 11β,16α,17α-trihydroxy-6-methyl-20-oxo-2'-phenyl - 4,6 - pregnadieno-[3,2-c]pyrazole is collected by filtration and dried.

*Example 31*

A suspension of 610 mg. of 20-ethylenedioxy-9α-fluoro-16α,17α,21 - trihydroxy-4-pregnene-3,11-dione 21-acetate in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After two hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 20-ethylenedioxy-9α-fluoro-16α,17α, 21-trihydroxy-2-hydroxymethylene-4-pregnene-3,11-dione, and/or formate esters thereof. A 25 mg. aliquot of 20-ethylenedioxy-9α-fluoro-16α,17α,21-trihydroxy-2-hydroxymethylene-4-pregnene-3,11-dione, and/or the formate esters thereof, is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. It is redissolved in 3 ml. of methanol and 0.5 ml. of sodium methoxide in methanol and left under nitrogen for 10 minutes. The alkoxide is neutralized with acetic acid and the mixture is diluted with ethyl acetate and washed with water. Removal of the dried solvent leaves 20-ethylenedioxy-9α-fluoro-16α,17α, 21-trihydroxy-11-oxo-4-pregneno-[3,2-c]pyrazole.

Sodium borohydride (200 mg.) is added to a solution of 250 mg. of 20-ethylenedioxy-9α-fluoro-16α,17α,21-trihydroxy-11-oxo-4-pregneno-[3,2-c]pyrazole, in 10 cc. of dimethyl formamide. After 18 hours, most of the solvent is removed in vacuo on a rotating evaporator, water is added and the product is collected by filtration. It is recrystallized from methanol to afford 20-ethylenedioxy-9α-fluoro-11β,16α,17α,21-tetrahydroxy-4-pregneno-[3,2-c] pyrazole.

A mixture of 2.9 grams of 20-ethylenedioxy-9α-fluoro-11β,16α,17α,21-tetrahydroxy-4-pregneno-[3,2-c]pyrazole, 100 ml. of methanol, and 6 ml. of a solution prepared by diluting 8 ml. of sulfuric acid to 100 ml. of water is refluxed for one hour and then concentrated in vacuo. The product is extracted with ethyl acetate and the extract is washed with aqueous sodium bicarbonate, salt, and then water. The mixture is dried over magnesium sulfate and then taken to dryness to give 9α-fluoro-11β,16α,17α·21-tetrahydroxy-20-oxo-4-pregneno-[3,2-c]pyrazole.

The 9α-fluoro-11β,16α,17α,21-tetrahydroxy-20-oxo - 4 - pregneno-[3,2-c]pyrazole (100 mg.) is heated for 3 minutes with 10 ml. of acetone to which 1 drop of concentrated hydrochloric acid has been added and then letting stand at room temperature for 24 hours. The mixture is then poured into a dilute sodium bicarbonate solution and extracted with ethyl acetate. The extracts are washed, dried over magnesium sulfate and taken to dryness to give the 9α-fluoro-11β,21-dihydroxy-16α,17α-isopropylidenedioxy-20-oxo-4-pregneno-[3,2-c]pyrazole.

The N - acetyl - 9α - fluoro - 11β,21 - dihydroxy-16α,17α - isopropylidenedioxy - 20 - oxo - 4 - pregneno-[3,2-c]pyrazole 21-acetate is prepared from the 9α-fluoro-11β,16α,17α,21 - tetrahydroxy - 20 - oxo - 4 - pregneno-[3,2-c]pyrazole by stirring 250 mg. of the steroid in 15 ml. of acetone containing 5 drops of 70% perchloric acid. After thirty minutes, aqueous sodium bicarbonate is added and the acetone is removed in vacuo. The residue is filtered off, air dried and then treated with 2 ml. of acetic anhydride and 2 ml. of pyridine for eighteen hours at room temperature. This acetylated mixture is taken off on a rotator at the oil pump. The residue is crystallized from a mixture of petroleum ether and ether to yield the N-acetyl-9α-fluoro-11β,21-dihydroxy-16α,17α-isopropylidenedioxy-20-oxo-4-pregneno-[3,2-c]pyrazole 21-acetate.

A solution of 5.73 g. of the N-acetyl-9α-fluoro-11β,21-dihydroxy - 16α,17α - isopropylidenedioxy - 20 - oxo - 4-pregneno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness in vacuo. The residue is dissolved in 150 ml. of acetone containing 2 ml. of 70% perchloric acid. After thirty minutes, aqueous sodium bicarbonate is added and the acetone is removed in vacuo. The product is extracted into chloroform which is washed with water, dried and removed in vacuo to yield after chromatography on neutral alumina 9α - fluoro - 11β,21 - dihydroxy - 16α,17α - isopropylidenedioxy-20-oxo-4-pregneno-[3,2-c]pyrazole 21-acetate.

9α - fluoro - 11β,21 - dihydroxy - 16α,17α - isopropylidenedioxy-20-oxo-4-pregneno-[3,2-c]pyrazole (500 mg.) is suspended in 25 ml. of 2,3-dihydropyran. A few drops of concentrated hydrochloric acid are added and magnetic stirring is continued for 6 hours, whereupon the solution is concentrated in vacuo. The residue is triturated with petroleum ether and recrystallized from a mixture of methylene chloride and petroleum ether or a mixture of ether and petroleum ether, to afford the 9α-fluoro - 11β - hydroxy - 21 - terahydropyranyloxy - 16α,17α-isopropylidenedioxy-20-oxo-4-pregneno-[3,2 - c]pyrazole.

To a solution of 100 mg. of 9α-fluoro-21-tetrahydropyranyloxy-11β-hydroxy - 16α,17α - isopropylidenedioxy-20-oxo-4-pregneno-[3,2-c]pyrazole in 2 ml. of pyridine is added 2 ml. of acetic anhydride. The mixture is allowed to stand over night at room temperature. It is taken to dryness in vacuo to afford the N-acetyl-9α-fluoro-21-tetrahydropyranyloxy-11β-hydroxy - 16α,17α - isopropylidenedioxy-20-oxo-4-pregneno-[3,2-c]pyrazole.

Without further purification, this substance is dissolved in 5 ml. of methanol containing 20 mg. of p-toluenesulfonic acid. The mixture is kept at room temperature for 4 hours. The solvent is removed in vacuo, ethyl acetate is added and the organic layer is washed several times with dilute sodium bicarbonate. The dried solvent is removed to yield after chromatography on neutral alumina N-acetyl-9α-fluoro-11β-21-dihydroxy - 16α,17α - isopropylidenedioxy-20-oxo-4-pregneno-[3,2-c]pyrazole.

To a solution of 85 mg. of N-acetyl-9α-fluoro-11β-21-dihydroxy - 16α,17α - isopropylidenedioxy-20-oxo-4-pregneno-[3,2-c]pyrazole in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, and dried and removed to give N-acetyl-9α-fluoro-11β,21-dihydroxy-16α,17α-isopropylidenedioxy-20-oxo-4-pregneno - [3,2-c]pyrazone 21-mesylate.

To 180 mg. of N-acetyl-9α-fluoro-11β,21-dihydroxy-16α,17α-isopropylidenedioxy-20-oxo-4-pregneno - [3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords N-acetyl-9α-fluoro-11β-hydroxy-21-iodo-16α,17α-isopropylidenedioxy-20-oxo-4-pregneno-[3,2-c]pyrazole.

The N - acetyl-9α-fluoro-11β-hydroxy-21-iodo-16α,17α-isopropylidenedioxy-20-oxo - 4 - pregneno-[3,2-c]pyrazole (100 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate in vacuo, the residue is left overnight under nitrogen in 5 ml. of methanol and 1 ml. of one molar sodium methoxide in methanol. The solvent is then removed in vacuo, ethyl acetate is added and, after a water wash, the solvent is dried and removed. Chromatography of the residue on neutral alumina affords some 9α-fluoro-11β-hydroxy-16α,17α-isopropylidenedioxy-20-oxo-4-pregneno - [3,2-c]pyrazole.

N-acetyl - 9α - fluoro-11β-hydroxy-16α,17α-isopropylidenedioxy-20-oxo-4-pregneno-[3,2-c]pyrazole (60 mg.) is treated under nitrogen with 1.0 ml. of one molar sodium methoxide in 10 ml. of methanol. After 1 hour, the methanol is removed in vacuo and the product is extracted with ethyl acetate and washed with water. Removal of the dried ethyl acetate affords 9α-fluoro-11β-hydroxy-16α, 17α-isopropylidenedioxy - 20 - oxo-4-pregneno-[3,2-c]pyrazole.

9α-fluoro - 11β - hydroxy-16α,17α-isopropylidenedioxy-20-oxo-4-pregneno-[3,2-c]pyrazole (1.5 g.) is added to 150 ml. of refluxing 60% formic acid. After twenty minutes, the solution is cooled and then poured into ice and water. After 18 hours, the 9α-fluoro-11β,16α,17α-trihydroxy-20-oxo-4-pregneno-[3,2-c]pyrazole is collected by filtration and dried.

The 20-ethylenedioxy - 16α,17α,21 - trihydroxy-4-pregnene-3,11-dione 21-acetate compounds used as starting materials for compound 1 of Flow Sheet A are prepared, starting with the known 11β,17α,21-trihydroxy-4-pregnene-3,20-dione, in accordance with the following procedures which are particularly described only with reference to 6α,9α-difluoro-11β,17α,21-trihydroxy-4-pregnene-3,20-dione, but are generally applicable to all of the starting materials defined by compound 1.

A mixture of 500 mg. of 6α,9α-difluoro-11β,17α,21-trihydroxy-4-pregnene-3,20-dione, 4 ml. of ethylene glycol, 25 ml. of benzene and 25 mg. of p-toluenesulfonic acid monohydrate is refluxed in a Dean-Stark water separator for 8 hours. The reaction mixture is then cooled and some pyridine and ethyl acetate are added. After extraction with dilute sodium bicarbonate, the organic layers are dried and removed in vacuo. The entire crude material is dissolved in 2 ml. of pyridine and 2 ml. of acetic anhydride, and then left overnight at room temperature. The reaction mixture is then taken to dryness on a rotating evaporator at the oil pump. The residue is dissolved in ethyl acetate and washed with dilute sodium bicarbonate. The ethyl acetate layer is then dried and the ethyl acetate is removed in vacuo. Chromatography on basic alumina affords 3ξ,20-bis(ethylenedioxy)-6α,9α-difluoro-11β,17α,21-trihydroxy-5-pregnene 21-acetate.

A solution of 400 mg. of 3ξ,20-bis(ethylenedioxy)-6α,9α - difluoro-11β,17α,21-trihydroxy-5-pregnene 21-acetate in 4 ml. of pyridine is added to the complex formed by the addition of 400 mg. of chromium trioxide to 4 ml. of pyridine. The mixture is thoroughly mixed and left at room temperature over night. The reaction mixture is poured into water. The aqueous mixture is extracted with ether and then twice with ethyl acetate. The combined solvent extracts are washed with dilute aqueous sulfuric acid at about 0° C. and then with dilute sodium bicarbonate. The organic solvent is dried and removed in vacuo. The residual material is purified by crystallization to give 3ξ,20 - bis(ethylenedioxy) - 6α,9α - difluoro-17α,21-dihydroxy-5-pregnene-11-one 21-acetate.

Thionyl chloride (0.45 ml.) is added dropwise to a magnetically stirred solution of 850 mg. of 3ξ,20-bis-(ethylenedioxy) - 6α,9α-difluoro-17α,21-dihydroxy-5-pregnene-11-one 21-acetate in 5 ml. of pyridine at −5° C. After 18 hours at this temperature the reaction mixture is poured into a stirred iced sodium bicarbonate solution. The product is extracted into chloroform and the chloroform layer is then dried and removed. Chromatography over basic alumina affords the 21-hydroxy-3ξ,20-bis(ethylenedioxy)-6α,9α-difluoro-5,16-pregnadiene-11-one 21-acetate.

A solution of 266 mg. of osmium tetroxide in 5 ml. of benzene is added dropwise to a stirred solution of 465 mg. of 21-hydroxy-3ξ,20-bis(ethylenedioxy)-6α,9α-difluoro-5-16-pregnadiene-11-one 21-acetate in 10 ml. of benzene and 0.3 ml. of pyridine. After one hour, there is added 12 ml. of methanol and then a solution of 1.3 g. of sodium sulfite and 1.3 g. of potassium bicarbonate in 18 ml. of water. This mixture is stirred vigorously for three hours and then filtered. The red-brown solid which is collected is extracted exhaustively with hot ethyl acetate. The combined organic layers are washed with water and taken to dryness. Crystallization from methanol affords 3ξ,20-bis(ethylenedioxy)-6α,9α-difluoro-16α,17α,21-trihydroxy-5-pregnene-11-one 21-acetate.

A solution of 150 mg. of 3ξ,20-bis(ethylenedioxy)-6α,9α-difluoro-16α,17α,21-trihydroxy-5-pregnene-11-one 21-acetate in 3 ml. of glacial acetic acid is heated on the steam bath for twenty minutes. It is then poured into ice and water and extracted into chloroform. The organic layer is washed with aqueous sodium bicarbonate until all of the acid has been removed. Evaporation of the dried chloroform layer leaves a residue which is chromatographed over basic alumina to yield a fraction which after crystallization from methanol is 20-ethylenedioxy-6α,9α-difluoro - 16α,17α,21 - trihydroxy-4-pregnene-3,11-dione 21-acetate (compound 1 of Flow Sheet A).

The 11β,21-dihydroxy - 16α,17α - isopropylidenedioxy-4-pregnene- (and 4,6-pregnadiene) 3,20-dione 21-acetate compounds used as starting materials for compound 8 of Flow Sheet B are prepared from known intermediates using the following procedures:

The known 9α-fluoro-11β,16α,17α,21-tetrahydroxy-4-pregnene-3,20-dione is converted into the 9α-fluoro-11β, 21-dihydroxy - 16α,17α - isopropylidenedioxy-4,6-pregnadiene-3,20-dione 21-acetate by reaction first with acetone in the presence of a trace of perchloric acid to form the acetonide, then with acetic anhydride in the presence of pyridine to give the 21-acetate and finally with chloranil to afford the 9α-fluoro-11β,21-dihydroxy-16α,17α-isopropylidene-dioxy-4,6-pregnadiene-3,20-dione 21-acetate.

Similarly, the known 11β,16α,17α,21-tetrahydroxy-6α-methyl-4-pregnene-3,20-dione and the known 9α-fluoro-11β,16α,17α,21 - tetrahydroxy-6α-methyl-4-pregnene-3,20-dione are converted into the corresponding 11β,21-dihydroxy - 6 - methyl-16α,7α-isopropylidenedioxy-4,6-pregnadiene-3,20-dione 2-acetate and the 9α-fluoro derivative thereof.

The 6-chloro-, or the 6-chloro-9α-fluoro-11β,21-dihydroxy - 16α,17α - isopropylidenedioxy-4,6-pregnadiene-3, 20-dione 21-acetate is prepared from the 11β,21-dihydroxy - 16α,17α - isopropylidenedioxy-4,6-pregnadiene-3, 20-dione 21-acetate, or its 9α-fluoro-derivative, respectively according to the following procedures:

The 9α-fluoro - 11β,21 - dihydroxy-16α,17α-isopropylidenedioxy - 4,6 - pregnadiene-3,20-dione 21-acetate (4.76 g.), is dissolved in 500 ml. of methylene chloride. To this is added with cooling 250 ml. of an ether solution of perphthalic acid (0.5 meq. per ml.). After 18 hours the reaction mixture is extracted with aqueous sodium carbonate, dried and concentrated in vacuo. Crystallization from a mixture of methylene chloride and ether affords 6α,7α-epoxy - 9α - fluoro-11β,21-dihydroxy-16α,17α-isopropylidenedioxy-4-pregnene-3,20-dione 21-acetate.

The 6α,7α-epoxy-9α-fluoro-11β,21-dihydroxy-16α,17α-isopropylidenedioxy-4-pregnene-2,20-dione 21-acetate (0.5 g.) is added to a 20 ml. of anhydrous chloroform which has been previously saturated with dry hydrogen chloride gas. After 8 hours at room temperature the reaction mixture is extracted with cold potassium carbonate solution and the organic layer is separated, dried and removed. The residue is stirred for thirty minutes with 20 ml. of acetone and 0.2 ml. of 70% perchloric acid. Then aqueous sodium bicarbonate is added and most of the acetone is removed in vacuo. The crude product is extracted into ethyl acetate and chromatographed on neutral alumina to afford 6-chloro-9α-fluoro-11β,21-dihydroxy-16α,17α - isopropylidenedioxy-4,6-pregnadiene-3,20-dione 21-acetate.

The 6-fluoro- and the 6,9α-difluoro-11β,21-dihydroxy-16α,17α - isopropylidenedioxy-4,6-pregnadiene-3,20-dione 21-acetate are prepared from 6α,7α-epoxy-11β,21-dihydroxy - 16α,17α - isopropylidenedioxy - 4 - pregnene-3,20-dione 21-acetate and the 9α-fluoro derivative according to the following procedures:

The 6α,7α-epoxy-9α-fluoro-11β,21-dihydroxy-16α,17α-isopropylidenedioxy-4-pregnene-3,20-dione 21-acetate (2.0 g.) is dissolved in 150 ml. of anhydrous chloroform and cooled at 70° C. To this solution is added slowly with stirring a mixture of 4.5 ml. of anhydrous tetrahydrofuran and 3.2 g. of dry hydrogen fluoride. The reaction mixture is allowed to come to room temperature, and after 20 hours it is poured into iced potassium carbonate solution. Ethyl acetate is added, the organic layer is separated, washed with water, dried and removed to yield 6β-fluoro - 7α,11β,21 - trihydroxy-16α,17α-isopropylidenedioxy-4-pregnene-3,20-dione 21-acetate.

The 6β-fluoro-7α,11β,21-trihydroxy-16α,17α-isopropylidenedioxy-4-pregnene-3,20-dione 21-acetate is added to 50 ml. of anhydrous chloroform saturated with dry hydrogen chloride gas. After standing 8 hours at room temperature, this solution is slowly poured into a stirred iced solution of potassium bicarbonate. The organic layer is separated, washed, dried and taken to dryness. The residue is stirred for thirty minutes with 50 ml. of acetone and 0.5 ml. of perchloric acid. Aqueous sodium bicarbonate is then added and most of the acetone is removed in vacuo. The crude product is extracted into ethyl acetate and after chromatography on neutral alumina affords 6,9α-difluoro-11β,21-dihydroxy-16α,17α-isopropylidenedioxy-4,6-pregnadiene-3,20-dione 21-acetate.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of compounds having structural formulas A and B

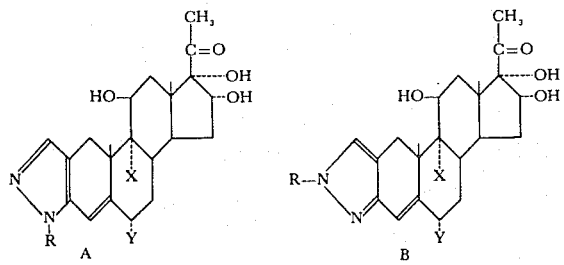

wherein R is a member of the group consisting of hydrogen, lower hydrocarbon carboxylic acyl, lower hydrocarbon aryl, lower alkyl, lower aralkyl, lower cycloalkyl, halophenyl, lower alkoxy phenyl, nitrophenyl, pyridyl, pyridyloxide and pyrimidyl, X is a member of the group consisting of hydrogen and fluoro, and Y is a member of the group consisting of hydrogen, chloro, fluoro and methyl; and pharmacologically acceptable salts of the foregoing compounds.

2. A compound selected from the group consisting of compounds having structures A and B

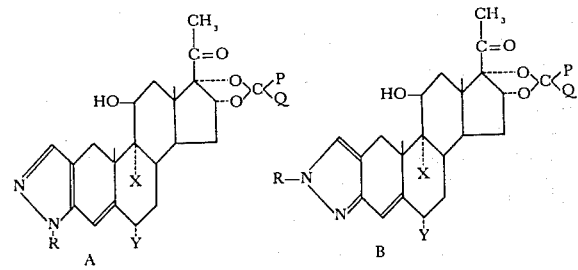

wherein R is a member of the group consisting of hydrogen, lower hydrocarbon carboxylic acyl, lower alkyl, lower aralkyl, lower cycloalkyl, lower hydrocarbon aryl, halophenyl, lower alkoxy phenyl, nitrophenyl, pyridyl, pyridyloxide and pyrimidyl, X is a member of the group consisting of hydrogen and fluoro, Y is a member of the group consisting of hydrogen, chloro, fluoro and methyl, P and Q are each selected from the group consisting of hydrogen, lower alkyl and lower hydrocarbon aryl, and together with the carbon to which they are joined, P and Q are lower cycloalkyl; and pharmacologically acceptable salts of all of the foregoing compounds.

3. A compound selected from the group consisting of $11\beta,16\alpha,17\alpha$ - trihydroxy - 20 - oxo - 4 pregneno - [3,2 - c]-pyrazole and the $16\alpha,17\alpha$-acetonide thereof.

4. A compound selected from the group consisting of $11\beta,16\alpha,17\alpha$ - trihydroxy - 20 - oxo - 2' - phenyl - 4 - pregneno-[3,2-c]pyrazole and the $16\alpha,17\alpha$-acetonide thereof.

5. A compound selected from the group consisting of $11\beta,16\alpha,17\alpha$ - trihydroxy - 20 - oxo - 2' - (p - fluorophenyl)-4-pregneno-[3,2-c]pyrazole and the $16\alpha,17\alpha$-acetonide thereof.

6. A compound selected from the group consisting of $6\alpha$ - fluoro - $11\beta,16\alpha,17\alpha$ - trihydroxy - 20 - oxo - 4- pregneno-[3,2-c]pyrazole and the $16\alpha,17\alpha$-acetonide thereof.

7. A compound selected from the group consisting of $6\alpha$ - fluoro - $11\beta,16\alpha,17\alpha$ - trihydroxy - 20 - oxo - 2'-phenyl-4-pregneno-[3,2-c]pyrazole and the $16\alpha,17\alpha$-acetonide thereof.

8. A compound selected from the group consisting of $6\alpha$ - fluoro - $11\beta,16\alpha,17\alpha$ - trihydroxy - 20 - oxo - 2' - (p-fluorophenyl)-4-pregneno-[3,2-c]pyrazole and the $16\alpha,17\alpha$-acetonide thereof.

9. A compound selected from the group consisting of $6\alpha$ - chloro- $11\beta,16\alpha,17\alpha$ - trihydroxy - 20 - oxo - 4 - pregneno-[3,2-c]pyrazole and the $16\alpha,17\alpha$-acetonide thereof.

10. A compound selected from the group consisting of $6\alpha$ - chloro - $11\beta,16\alpha,17\alpha$ - trihydroxy - 20 - oxo - 2'-phenyl-4-pregneno-[3,2-c]pyrazole and the $16\alpha,17\alpha$-acetonide thereof.

11. A compound selected from the group consisting of $6\alpha$ - chloro - $11\beta,16\alpha,17\alpha$ - trihydroxy - 20 - oxo - 2' - (p-fluorophenyl)-4-pregneno-[3,2-c]pyrazole and the $16\alpha,17\alpha$-acetonide thereof.

12. A compound selected from the group consisting of $11\beta,16\alpha,17\alpha$ - trihydroxy - $6\alpha$ - methyl - 20 - oxo - 4 - pregneno-[3,2-c]pyrazole and the $16\alpha,17\alpha$-acetonide thereof.

13. A compound selected from the group consisting of $11\beta,16\alpha,17\alpha$ - trihydroxy - $6\alpha$ - methyl - 20 - oxo - 2'-phenyl-4-pregneno-[3,2-c]pyrazole and the $16\alpha,17\alpha$-acetonide thereof.

14. A compound selected from the group consisting of $11\beta,16\alpha,17\alpha$ - trihydroxy - $6\alpha$ - methyl - 20 - oxo - 2' - (p-fluorophenyl)-4-pregneno-[3,2-c]pyrazole and the $16\alpha,17\alpha$-acetonide thereof.

15. A compound selected from the group consisting of $9\alpha$ - fluoro - $11\beta,16\alpha,17\alpha$ - trihydroxy - 20 - oxo - 4 - pregneno-[3,2-c]pyrazole and the $16\alpha,17\alpha$-acetonide thereof.

16. A compound selected from the group consisting of $9\alpha$ - fluoro - $11\beta,16\alpha,17\alpha$ - trihydroxy - 20 - oxo - 2'-phenyl-4-pregneno-[3,2-c]pyrazole and the $16\alpha,17\alpha$-acetonide thereof.

17. A compound selected from the group consisting of $9\alpha$ - fluoro - $11\beta,16\alpha,17\alpha$ - trihydroxy - 20 - oxo - 2' - (p-fluorophenyl)-4-pregneno-[3,2-c]pyrazole and the $16\alpha,17\alpha$-acetonide thereof.

18. A compound selected from the group consisting of $6\alpha,9\alpha$ - difluoro - $11\beta,16\alpha,17\alpha,21$ - trihydroxy - 20 - oxo-4-pregneno-[3,2-c]pyrazole and the $16\alpha,17\alpha$-acetonide thereof.

19. A compound selected from the group consisting of $6\alpha,9\alpha$ - difluoro - $11\beta,16\alpha,17\alpha,21$ - trihydroxy - 20 - oxo-2'-phenyl-4-pregneno-[3,2-c]pyrazole and the $16\alpha,17\alpha$-acetonide thereof.

20. A compound selected from the group consisting of $6\alpha,9\alpha$ - difluoro - $11\beta,16\alpha,17\alpha,21$ - trihydroxy - 20 - oxo-2'-(p-fluorophenyl)-4-pregneno-[3,2-c]pyrazole and the $16\alpha,17\alpha$-acetonide thereof.

21. A compound selected from the group consisting of $6\alpha$ - chloro - $9\alpha$ - fluoro - $11\beta,16\alpha,17\alpha$ trihydroxy - 20-oxo-4-pregneno-[3,2-c]pyrazole and the $16\alpha,17\alpha$-acetonide thereof.

22. A compound selected from the group consisting of $6\alpha$ - chloro - $9\alpha$ - fluoro - $11\beta,16\alpha,17\alpha$ trihydroxy - 20-oxo-2'-phenyl-4-pregneno-[2,3-c]pyrazole and the $16\alpha,17\alpha$-acetonide thereof.

23. A compound selected from the group consisting of $6\alpha$ - chloro - $9\alpha$ - fluoro - $11\beta,16\alpha,17\alpha$ trihydroxy - 20-oxo-2'-(p-fluorophenyl)-4-pregneno-[3,2-c]pyrazole and the $16\alpha,17\alpha$-acetonide thereof.

24. A compound selected from the group consisting of $9\alpha$ - fluoro - $11\beta,16\alpha,17\alpha$ - trihydroxy - $6\alpha$ - methyl - 20-oxo-4-pregneno-[3,2-c]pyrazole and the $16\alpha,17\alpha$-acetonide thereof.

25. A compound selected from the group consisting of $9\alpha$ - fluoro - $11\beta,16\alpha,17\alpha$ - trihydroxy - $6\alpha$ - methyl - 20-oxo-2'-phenyl-4-pregneno-[3,2-c]pyrazole and the $16\alpha,17\alpha$-acetonide thereof.

26. A compound selected from the group consisting of $9\alpha$ - fluoro - $11\beta,16\alpha,17\alpha$ - trihydroxy - $6\alpha$ - methyl - 20-oxo-2'-(p-fluorophenyl)-4-pregneno-[3,2-c]pyrazole and the $16\alpha,17\alpha$-acetonide thereof.

No references cited.